(12) United States Patent
Bull et al.

(10) Patent No.: US 12,530,109 B2
(45) Date of Patent: Jan. 20, 2026

(54) MANAGING PROJECTS AND ORGANIZING ACTIVITIES IN A WEB-BASED WORKSPACE

(71) Applicant: Dell Products, L.P., Round Rock, TX (US)

(72) Inventors: Spencer G. Bull, Conroe, TX (US); Michiel Sebastiaan Emanuel Petrus Knoppert, Amsterdam (NL); Mark R. Ligameri, Decatur, GA (US); David O. Garner, Cedar Park, TX (US); Christopher Alan Robinette, Fremont, OH (US)

(73) Assignee: Dell Products, L.P., Round Rock, TX (US)

(*) Notice: Subject to any disclaimer, the term of this patent is extended or adjusted under 35 U.S.C. 154(b) by 974 days.

(21) Appl. No.: 17/649,977

(22) Filed: Feb. 4, 2022

(65) Prior Publication Data

US 2023/0251765 A1    Aug. 10, 2023

(51) Int. Cl.
| | |
|---|---|
| *G06F 3/04817* | (2022.01) |
| *G06F 3/0482* | (2013.01) |
| *G06F 3/0483* | (2013.01) |
| *G06F 3/0486* | (2013.01) |
| *G06F 16/955* | (2019.01) |
| *G06F 40/134* | (2020.01) |
| *G06Q 10/10* | (2023.01) |
| *H04L 67/02* | (2022.01) |

(52) U.S. Cl.
CPC ........ *G06F 3/0483* (2013.01); *G06F 3/04817* (2013.01); *G06F 3/0482* (2013.01); *G06F 3/0486* (2013.01); *G06F 16/9558* (2019.01); *G06F 40/134* (2020.01); *G06Q 10/103* (2013.01); *H04L 67/02* (2013.01)

(58) Field of Classification Search
CPC .................................................. G06F 3/048–05
See application file for complete search history.

(56) References Cited

U.S. PATENT DOCUMENTS

| | | | | |
|---|---|---|---|---|
| 8,676,806 | B2 * | 3/2014 | Simard | G06F 16/93 |
| | | | | 715/255 |
| 11,048,531 | B1 * | 6/2021 | Qiao | G06F 16/3344 |
| 2002/0196273 | A1 * | 12/2002 | Krause | G06F 16/957 |
| | | | | 707/E17.119 |
| 2004/0093397 | A1 * | 5/2004 | Chiroglazov | G06F 21/125 |
| | | | | 709/219 |
| 2004/0117759 | A1 * | 6/2004 | Rippert, Jr. | G06F 8/20 |
| | | | | 717/113 |
| 2008/0104535 | A1 * | 5/2008 | DeLine | G06F 3/0483 |
| | | | | 715/785 |

(Continued)

*Primary Examiner* — Daniel Rodriguez
(74) *Attorney, Agent, or Firm* — Fogarty LLP

(57) ABSTRACT

Systems and methods for managing projects and organizing activities in a web-based workspace are described. In some embodiments, an Information Handling System (IHS) may include a processor and a memory coupled to the processor, the memory having program instructions stored thereon that, upon execution, cause the IHS to, in response to a determination that a user has selected a project management control in a Graphical User Interface (GUI) of a web browser, assemble a plurality of Uniform Resource Locators (URLs) open in distinct web browser tabs into a project.

15 Claims, 25 Drawing Sheets

(56) References Cited

U.S. PATENT DOCUMENTS

| | | | |
|---|---|---|---|
| 2009/0158176 A1* | 6/2009 | Kalaboukis | G06F 16/958 |
| | | | 715/758 |
| 2009/0265607 A1* | 10/2009 | Raz | G06F 16/957 |
| | | | 709/217 |
| 2010/0289740 A1* | 11/2010 | Kim | G06F 3/046 |
| | | | 345/157 |
| 2011/0225506 A1* | 9/2011 | Casalaina | G06F 3/0481 |
| | | | 715/744 |
| 2016/0357363 A1* | 12/2016 | Decker | G06F 3/165 |
| 2017/0102836 A1* | 4/2017 | Yoon | G06F 3/04817 |
| 2018/0096273 A1* | 4/2018 | Arnott | G06Q 10/00 |
| 2018/0189734 A1* | 7/2018 | Newhouse | G06F 16/25 |
| 2019/0057335 A1* | 2/2019 | Dyer | G06Q 10/06311 |
| 2019/0080289 A1* | 3/2019 | Kreitler | G06F 3/04845 |
| 2019/0377586 A1* | 12/2019 | Faulkner | G06F 9/451 |
| 2020/0267232 A1* | 8/2020 | Moran | G06F 11/3055 |
| 2020/0351314 A1* | 11/2020 | Butcher | H04L 65/4025 |
| 2021/0382734 A1* | 12/2021 | Rosenstein | G06Q 10/063114 |
| 2022/0116552 A1* | 4/2022 | Benjamin | H04L 65/1089 |
| 2022/0210342 A1* | 6/2022 | Stickane | G06F 3/0482 |
| 2022/0232190 A1* | 7/2022 | Tong | G06V 40/166 |
| 2022/0391456 A1* | 12/2022 | Weskamp | G06F 3/0485 |
| 2023/0186193 A1* | 6/2023 | Chen | G06Q 10/06 |
| | | | 705/7.14 |
| 2023/0316182 A1* | 10/2023 | Zhang | G06Q 10/06313 |
| | | | 705/7.23 |
| 2024/0111411 A1* | 4/2024 | Kittur | G06Q 10/06311 |

\* cited by examiner

MANAGING PROJECTS AND ORGANIZING ACTIVITIES IN A WEB-BASED WORKSPACE

FIELD

This disclosure relates generally to Information Handling Systems (IHSs), and, more specifically, to systems and methods for managing projects and organizing activities in a web-based workspace.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for managing projects and organizing activities in a web-based workspace are described. In an illustrative, non-limiting embodiment, an Information Handling System (IHS) may include a processor and a memory coupled to the processor, the memory having program instructions stored thereon that, upon execution, cause the IHS to, in response to a determination that a user has selected a project management control in a Graphical User Interface (GUI) of a web browser, assemble a plurality of Uniform Resource Locators (URLs) open in distinct web browser tabs into a project.

The program instructions, upon execution, may cause the IHS to prompt the user for a name and to associate the name with the project. Additionally, or alternatively, the program instructions, upon execution, may cause the IHS to categorize the project with metadata obtained from one or more of the plurality of URLs. The metadata obtained from one or more of the plurality of URLs may be further selected by the user.

The program instructions, upon execution, may cause the IHS to select a color palette for the project based, at least in part, upon a representative color of at least one image selected from at least one of the plurality of URLs. Additionally, or alternatively, the program instructions, upon execution, may cause the IHS to recommend at least one of: a team member, a calendar, a web app, or a data source to associate with the project. Additionally, or alternatively, the program instructions, upon execution, may cause the IHS to allow the user to select a storage location for one or more data sources associated with the project.

To assemble the plurality of URLs into a project, the program instructions, upon execution, may cause the IHS to: parse at least one of the plurality of URLs into a resource and a data source; add at least one web app icon corresponding to the resource to a launch bar of the web browser; and associate a link preview of the data source with the web app icon. Moreover, to assemble the plurality of URLs into a project, the program instructions, upon execution, may cause the IHS to create a given tile for the project, wherein the given tile comprises an image selected from one of the plurality of URLs.

The program instructions, upon execution, may cause the IHS to: display a plurality of tiles, each of the plurality of tiles associated with a different project; and in response to a determination that the user has selected the given tile, open the project. To open the project, the program instructions, upon execution, may cause the IHS to open the plurality of URLs within two or more web browser tabs concurrently displayed in a foreground. Additionally, or alternatively, to open the project, the program instructions, upon execution, further cause the IHS to display web app icons associated with the project in a launch bar of the web browser.

The program instructions, upon execution, further cause the IHS to display an animated representation of a team member associated with the project during a communication session between the user and the team member. The program instructions, upon execution, further cause the IHS to: determine that a user has selected another project management control while the project is open; and in response to the determination, display a project management interface comprising at least one of: a project management panel, a team members panel, a team activity panel, or a team resources panel.

The program instructions, upon execution, further cause the IHS to: determine that a user has selected a storage service from the team resources panel; and in response to the determination, copy data associated with the project to the storage service, and grant at least one team member associated with the project access to the storage service. The project management interface may be selected based, at least in part, upon context information selected from the group consisting of: a type of IHS, a posture of the IHS, a location of the IHS, an identity of the user, and a proximity of the user with respect to the IHS.

In another illustrative, non-limiting embodiment, a memory storage device may have program instructions stored thereon that, upon execution by an IHS, cause the IHS to: assemble: (i) a first URL open in first web browser tab displayed in a foreground and (ii) a second URL open in second web browser tab displayed in a background into a project, create a tile for the project, where the tile comprises an image selected from the first or second URLs, and, in response to a determination that the user has selected the tile, open the project. To open the project, the program instructions, upon execution, may cause the IHS to open the first and second URLs within respective web browser tabs concurrently displayed in a foreground.

In another illustrative, non-limiting embodiment, a method may include: assembling a plurality of URLs open in distinct tabs of a web browser into a project, parsing at least one of the plurality of URLs into a resource and a data source, associating at least one web app icon with the resource, associating a link preview of the data source with the web app icon, and creating a tile for the project, wherein the tile comprises an image selected from one of the plurality of URLs. The method may further include opening the project in response to a determination that the user has selected the tile, at least in part, by displaying the web app icon in a launch bar of the web browser and opening at least two of the plurality of URLs within respective tabs concurrently displayed in a foreground.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. It should be appreciated that although certain embodiments are discussed in the context of a personal computing device, other embodiments may utilize various other types of IHSs.

Figure 1:
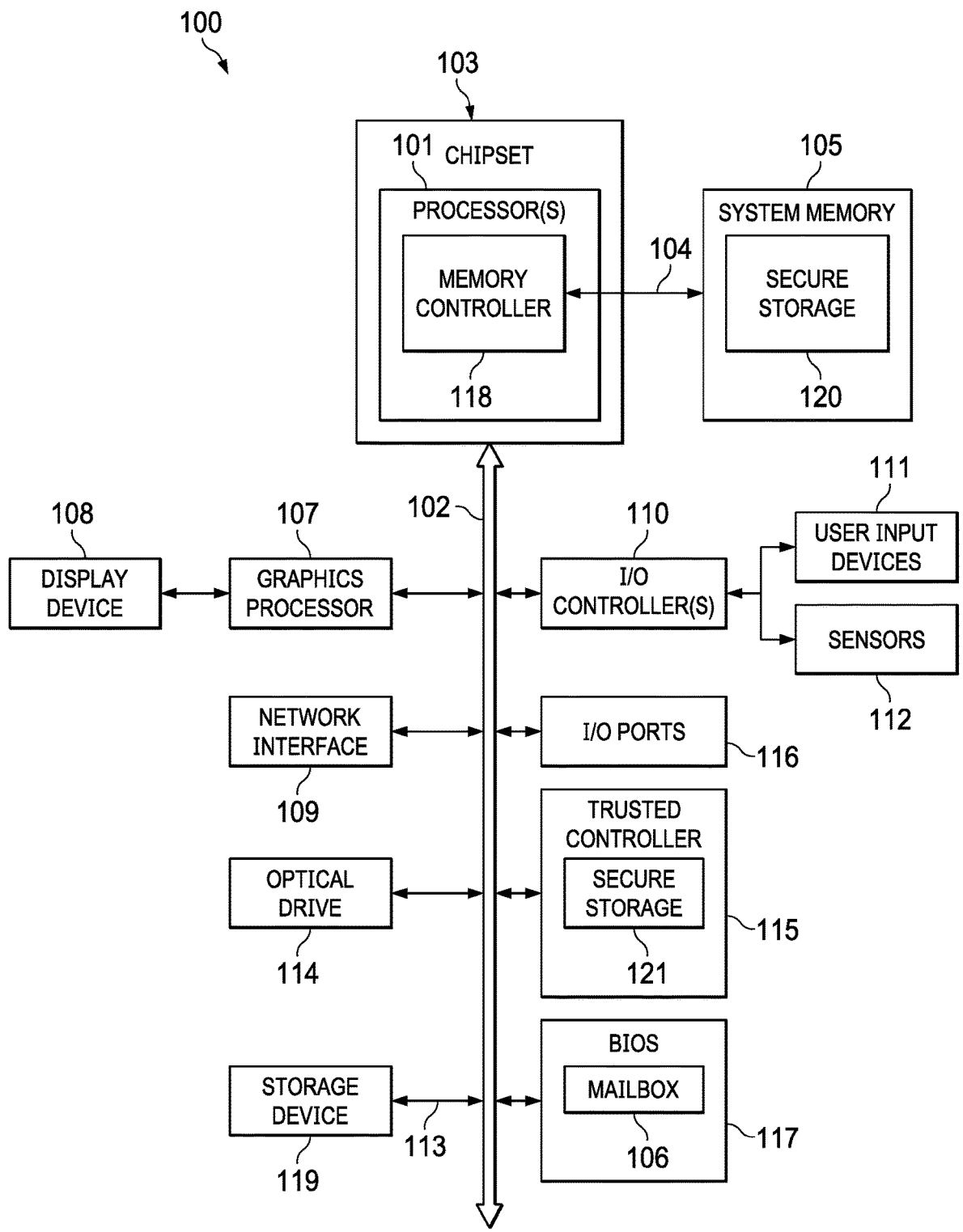
FIG. 1 is a diagram depicting examples of components of an Information Handling System (IHS) configured to provide application management and navigation, manage projects, organize activities, assist users, and move activities between devices in a web-based workspace, according to some embodiments.

FIG. 1 is a diagram depicting components of an example IHS 100 configured to provide application management and navigation, manage projects, organize activities, assist users, and move activities between devices in a web-based workspace. As shown, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing operations.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. Memory controller 118 may be implemented directly within the circuitry of processor(s) 101 or it may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 via memory bus 104 and provides processor(s) 101 with a high-speed memory that may be used in the execution of computer program instructions by processor(s) 101. For example, system memory 105 may include memory components such as such as Static RAM (SRAM), Dynamic RAM (DRAM), NAND Flash memory, or any other hardware memory device suitable for supporting high-speed memory operations by processor(s) 101. In some embodiments, system memory 105 may combine both persistent, non-volatile memory and volatile memory.

In certain embodiments, system memory 105 may include secure storage 120 specifically designated for the storage of sensitive information such as access policies, component signatures, encryption keys, and/or other cryptographic data. In such embodiments, a signature may be calculated based on the contents of secure storage 120 and stored as a reference signature. The integrity of the data stored in secure storage 120 may then be validated later by recalculating this signature of the contents of the secure storage and comparing the recalculated signature against the reference signature.

IHS 100 utilizes chipset 103 having one or more integrated circuits coupled to processor(s) 101. In the embodiment of FIG. 1, processor(s) 101 are depicted as component(s) of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 through chipset 103. For instance, chipset 103 may be coupled to network interface 109, such as provided by a Network Interface Controller (NIC), to allow IHS 100 to communicate via a network, such as the Internet or a Local Area Network (LAN). Network interface device 109 may provide IHS 100 with wired and/or wireless network connections via a variety of network technologies, such as wireless cellular or mobile networks (e.g., code-division multiple access "CDMA," time-division multiple access or "TDMA," Long-Term Evolution or "LTE," etc.), WiFi, BLUETOOTH, etc. In certain embodiments, network interface 109 may support connections between a trusted IHS component, such as Trusted or Embedded Controller (EC) 115, and a remote orchestration service (e.g., cloud workspace service 206 of FIG. 2). In such embodiments, a connection supported by network interface 109 between such an orchestration service and EC 115 may be an out-of-band (OOB) connection isolated from any Operating System (OS) of the IHS.

Chipset 102 may also provide access to one or more display device(s) 108 via graphics processor 107. In certain embodiments, graphics processor 107 may include a video or graphics card or controller configured to generate display information and to provide the generated information to one or more display device(s) 108.

Display device(s) 108 may utilize Liquid Crystal Display (LCD), Light Emitting Diode (LED), organic LED (OLED), or other thin film display technologies. Each of display device(s) 108 may be capable of touch input such as via a touch controller which may be an embedded component of display device(s) 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may receive data obtained by inertial movement sensors, including accelerometers, gyroscopes, and/or magnetometer sensors, and it may determine the orientation and movement of IHS 100 based, at least in part, on that data (e.g., IHS 100 is motionless on a relatively flat surface, IHS 100 is being moved irregularly and is likely in transport, the hinge of IHS 100 is oriented in a vertical direction).

In certain embodiments, the sensor hub may also include capabilities for determining a location and movement of IHS 100 based on triangulation of network signals and/or based on network information provided by the OS and/or network interface 109. In some embodiments, the sensor hub may support additional sensors, such as optical, infrared and sonar sensors, that may provide support for xR (virtual, augmented, and/or mixed reality) sessions hosted by IHS 100 and that may be used to provide an indication of a user's presence near IHS 100, such as whether a user is present, absent, and/or facing integrated display 108.

In cases where the end-user is before IHS 100, the sensor hub may further determine a distance between the end-user and IHS 100. Such a determination may be made continuously, at periodic intervals, or upon request. These detected, calculated, or estimated distances may be used by processor(s) 101 to classify the user as being in IHS 100's near-field (user's position<threshold distance A), mid-field (threshold distance A<user's position<threshold distance B, where B>A), or far-field (user's position>threshold distance C, where C>B).

In embodiments where IHS 100 supports multiple physical configurations, such as a convertible laptop, N-in-1 device, or the like, the sensor hub may utilize one or more mode sensors 112 that collect readings usable to determine the posture in which IHS 100 is physically configured. In certain embodiments, posture determinations may be additionally made using movement and orientation information provided by sensors 112. In laptop and convertible laptop embodiments, for example, processor(s) 101 or EC 115 may utilize a lid position sensor 112 to determine the relative angle between the two panels of the laptop to determine the mode in which IHS 100 is physically configured. For example, the lid position sensor may measure the angle of rotation of the hinge that connects the base panel and lid panel of IHS 100. In some cases, processor(s) 101 or EC 115 may provide collected lid position information, such as the hinge angle, to the sensor hub for use in determining the posture in which IHS 100 is configured. Alternatively, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further identify the posture in which IHS 100 is physically configured.

For instance, if the sensor hub determines that IHS 100 is configured with a hinge angle characteristic of a laptop configuration, but IHS 100 is oriented on its side, IHS 100 may be determined to be in a book posture. Additionally, or alternatively, if IHS 100 is determined to be tilted such that the hinge is oriented between horizontal and vertical, the user's face is detected to be facing the integrated display, and IHS 100 is experiencing slight movement, the sensor hub may determine that IHS 100 is being used in the book posture.

The sensor hub may determine that IHS 100 is opened to a 180-degree hinge angle and lies on a flat surface, thus indicating that IHS 100 it is being used in a landscape posture. The sensor hub may similarly determine that IHS 100 is in a tent posture, in response to detecting a hinge angle within a defined range, such as between 300 and 345 degrees, and detecting an orientation of IHS 100 where the hinge is aligned horizontally and is higher than both display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via I/O port 116 may include storage devices that support transfer of data to and from system memory 105 and/or storage devices 119 of IHS 100. Access to storage devices via I/O port 116 may result in a change in a security profile of IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117's instructions to initialize and test hardware components coupled to IHS 100. Upon execution, these instructions may facilitate the loading of an OS (e.g., WINDOWS, MACOS, iOS, ANDROID, LINUX, etc.) for use by IHS 100. BIOS 117 provides an abstraction layer that allows the OS to interface with hardware components of IHS 100. The Unified Extensible Firmware Interface (UEFI) was designed as a successor to BIOS. As a result, many IHS 100 may utilize UEFI in addition to or instead of a BIOS. As used herein, BIOS is intended to also encompass UEFI.

As illustrated, BIOS 117 may include a predefined memory or memory region that may be referred to as Non-Volatile Memory (NVM) mailbox 106. In such an implementation, mailbox 106 provides a secured storage location for use in storing access policies, signatures, cryptographic keys, or other data. For example, BIOS mailbox 106 may be utilized as a secure storage utilized by remote services. BIOS mailbox 106 and secured storage 120 in system memory 105 may be utilized in this manner instead of, or in conjunction with, out-of-band functions implemented by EC 115.

EC 115 may be installed as a component of the motherboard of IHS 100. EC 115 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 115 may be used to operate a secure execution environment that may include operations for providing various core operations of IHS 100, such as power management and management of certain modes of IHS 100 (e.g., turbo modes, maximum operating clock frequencies of certain components, etc.).

IHS 100 may support the use of various power modes. In some embodiments, the power modes of IHS 100 may be implemented through operations of EC 115 and/or the OS of IHS 100. In various embodiments, IHS 100 may support different reduced power modes to reduce power consumption and/or conserve battery power when IHS 100 is not actively in use, and/or to control a level of performance available to the user by increasing or decreasing a maximum operating clock frequency of a component of IHS 100 (e.g., processor(s) 101).

For example, in some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 115 may implement operations for detecting certain changes to the physical configuration of IHS 100 and managing the modes corresponding to different physical configurations of IHS 100. For instance, where IHS 100 is a laptop computer or a convertible laptop computer, EC 115 may receive inputs from a lid position sensor 112 that may detect whether the two sides of the laptop have been latched together to a closed position. In response to lid position sensor 112 detecting latching of the lid of IHS 100, EC 115 may initiate operations for shutting down IHS 100 or placing IHS 100 in a low-power mode.

EC 115 may be additionally configured to calculate signatures that uniquely identify individual components of IHS 100. In such scenarios, EC 115 may calculate a hash value based on the configuration of a hardware and/or software component coupled to IHS 100. For instance, EC 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

EC 115 may be further configured to recalculate a hash value later for such a component. The hash value recalculated for the component may then be compared against the reference hash value signature to determine if any modifications have been made to a component, thus indicating the component has been compromised. In this manner, EC 115 may be used to validate the integrity of hardware and software components installed on IHS 100. In some cases, secure storage 121 may be utilized as a secure storage utilized by a remote service to store policies and/or cryptographic keys.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip. As such, in certain embodiments, IHS 100 may be implemented as different classes of computing devices including, but not limited to: servers, workstations, desktops, laptops, appliances, video game consoles, tablets, smartphones, etc.

In various systems and methods described herein, IHS 100 may be configured to provide application management and navigation, manage projects, organize activities, assist users, and/or move activities between devices in a web-based workspace, such as a web browser, web portal, or the like, which may be loaded on IHS 100 when a user logs or authenticates onto that device.

Figure 2:
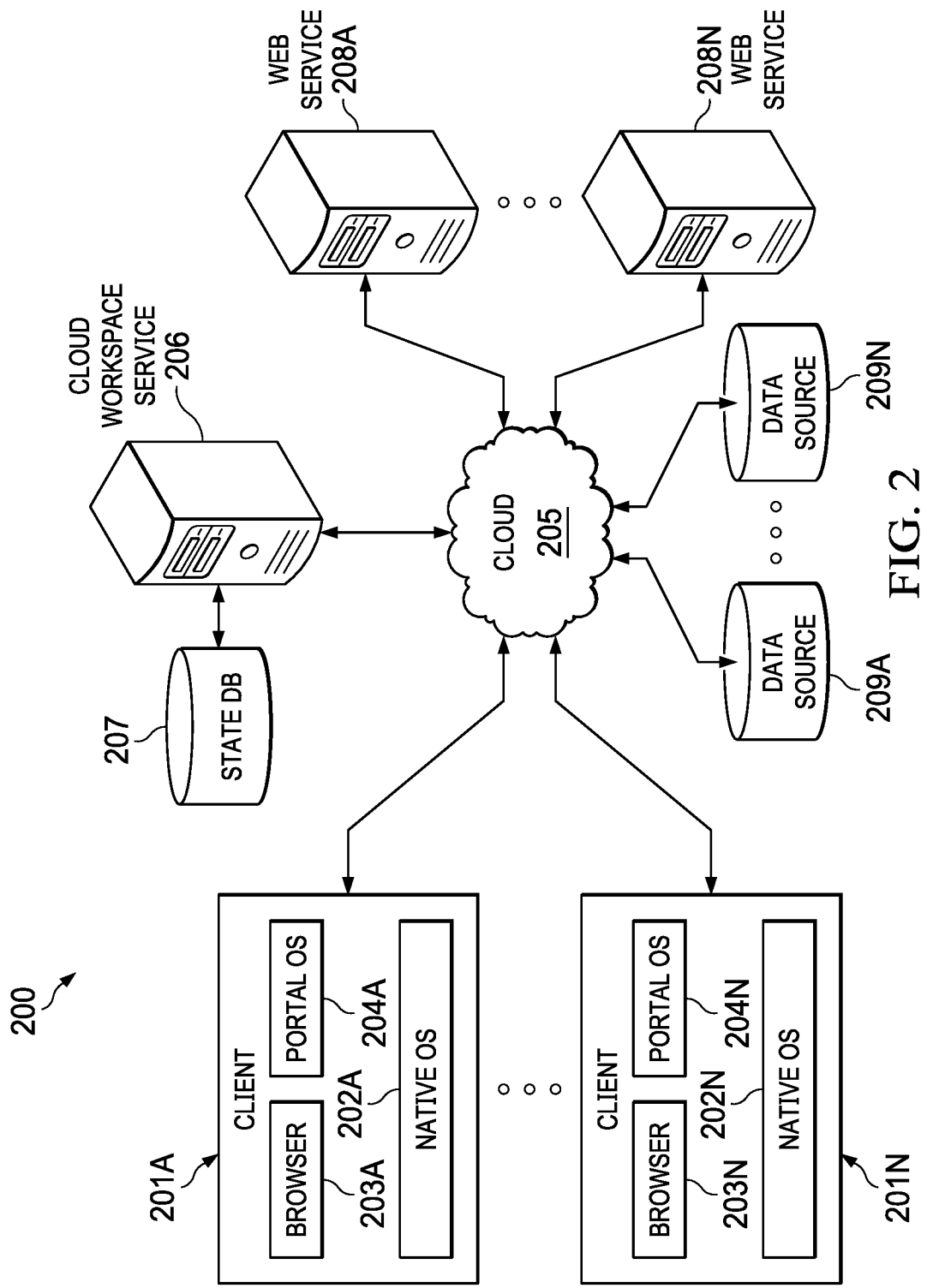
FIG. 2 is a diagram of an example of a system configured to provide application management and navigation, manage projects, organize activities, assist users, and move activities between devices in a web-based workspace, according to some embodiments.

FIG. 2 is a diagram of an example of system 200 configured to provide application management and navigation, manage projects, organize activities, assist users, and move activities between devices in a web-based workspace. Clients 201A-N may be implementations of IHS 100. In some cases, clients 201A-N may have different form-factors, be located at different locations, and/or be operated by different users (e.g., different team members of a project).

Each of clients 201A-N may include a corresponding native OS 202A-N, web browser 203A-N, and portal OS module 204A-N, respectively.

Native OS 202A-N may include, but is not limited to, WINDOWS, MACOS, iOS, ANDROID, LINUX, etc. Web browsers 203A-N may include, but are not limited to, any proprietary browser, EDGE, INTERNET EXPLORER, CHROME, FIREFOX, SAFARI, OPERA, etc. Portal OS modules 204A-N may include program instructions that, upon execution, configure IHS 100 to perform various operations described below. In various implementations, portal OS modules 204A-N may be included in native OS 202A-N or in web browser 203A-N. Additionally, or alternatively, portal OS modules 204A-N may be provided as a web browser extension or add-on, a mobile application, a tablet application, etc.

Clients 201A-N communicate with web services 108A-N via cloud 205 (e.g., the Internet). Particularly, browsers 203A-N may each be configured to establish a client-server relationship with web services 208A-N, and to present graphical web app interfaces to users as they interact with remotely executed web applications hosted by web services 208A-N.

Web applications (or "web apps") are programs that are executed on a remote server and delivered to IHS 100 over the Internet, unlike other software programs that are run locally on IHS 100's native OS. Web apps are typically accessed through web browsers 203A-N with an active network connection. Web apps are programmed using a client-server modeled structure, such that the user ("client") is provided services through an off-site server hosted by a third-party, such as web services 208A-N. In some cases, a dynamic web page (i.e., a web page whose construction is controlled by an application server processing server-side scripts) may also be considered a web app.

In some implementations, web apps may manipulate data sources (e.g., files, documents, presentations, spreadsheets, webpages, messages, e-mails, images, audio, video, etc.) stored by web services 208A-N. In other implementations, data may be stored in third-party databases 209A-N, which in some cases may provide cloud storage or file-sharing services including, but not limited to: ONEDRIVE, BOX, GOOGLE DRIVE, DROPBOX, APPLE ICLOUD, SPIDEROAK ONE, etc. In yet other implementations, web apps may modify local content, such as content downloaded by client 201A-N (e.g., a user downloads a document from a service, digitally signs it, and re-uploads the document to another service).

To preserve state data that facilitates the operations described below, portal OS modules 204A-N may be in communications with cloud workspace service 206, which maintains state database 207. Each of clients 201A-N may have a publisher/subscriber relationship with cloud workspace service 206 with respect to their own state data, and, in some cases, with respect to the state data of other clients 201A-N. State database 207 may include, for each browser 203A-N, an indication of web apps added to the browser's launch bar, link previews for each data source associated with each web app, current context information for each of clients 201A-N, as well as other metadata related to projects, project participants, etc.

Application Management and Navigation in a Web-Based Workspace

The perceived value of web apps is different from that of locally run, native OS applications. Users often consider web apps to be less valuable than OS-based applications because: (i) a web app does not get installed in IHS 100, (ii) there is no management or icon on IHS 100's desktop, making the web app feel more fleeting and lightweight, (iii) the Internet historically did not offer powerful applications, etc.

Although today's users may spend significant time working on the web—and using more web-apps than they are aware of—they are still mostly familiar dealing with locally installed, native OS-based applications that are launched from a taskbar, desktop, or file explorer. In native OS applications, every document is stored on a disk in a folder. The user can get to a document by opening it in the folder, and thereby launching the associated application, or they can browse for the document inside the application, none of which is currently possible with web apps.

To address these, and other concerns, systems and methods described herein may provide a native OS-like application management and navigation in a web-based environment. In some cases, a user may not only add a web app to a set of saved applications, but they may add specific data source(s) to the web app through a web browser's user interface. Moreover, when the user has a web app open (e.g., in a browser tab), they may have access to related files or data sources associated therewith. In various implementations, web apps do not need to be conventionally "installed" in the user's workspace; rather, they may instantiate themselves when accessing a website or resource such that no extra deployment of a traditional web app is needed for our workspace to "install" the application.

For example, systems and methods described herein may enable dynamically adding a web app and corresponding data source to a web browser by clicking-and-dragging a browser tab or web app to a browser's launch bar. On hover or right-clicking of a web app icon in the browser's launch bar, the user may see a link preview of data sources associated with that web app. In some cases, various data source link previews for a given web app may be selected and presented to the user based upon context.

Embodiments described herein are not restricted to static application integrations. Rather, these systems and methods may work for any Uniform Resource Locator (URL) to turn that URL into a web app object, and to group data sources and files related to that object.

Figure 3:
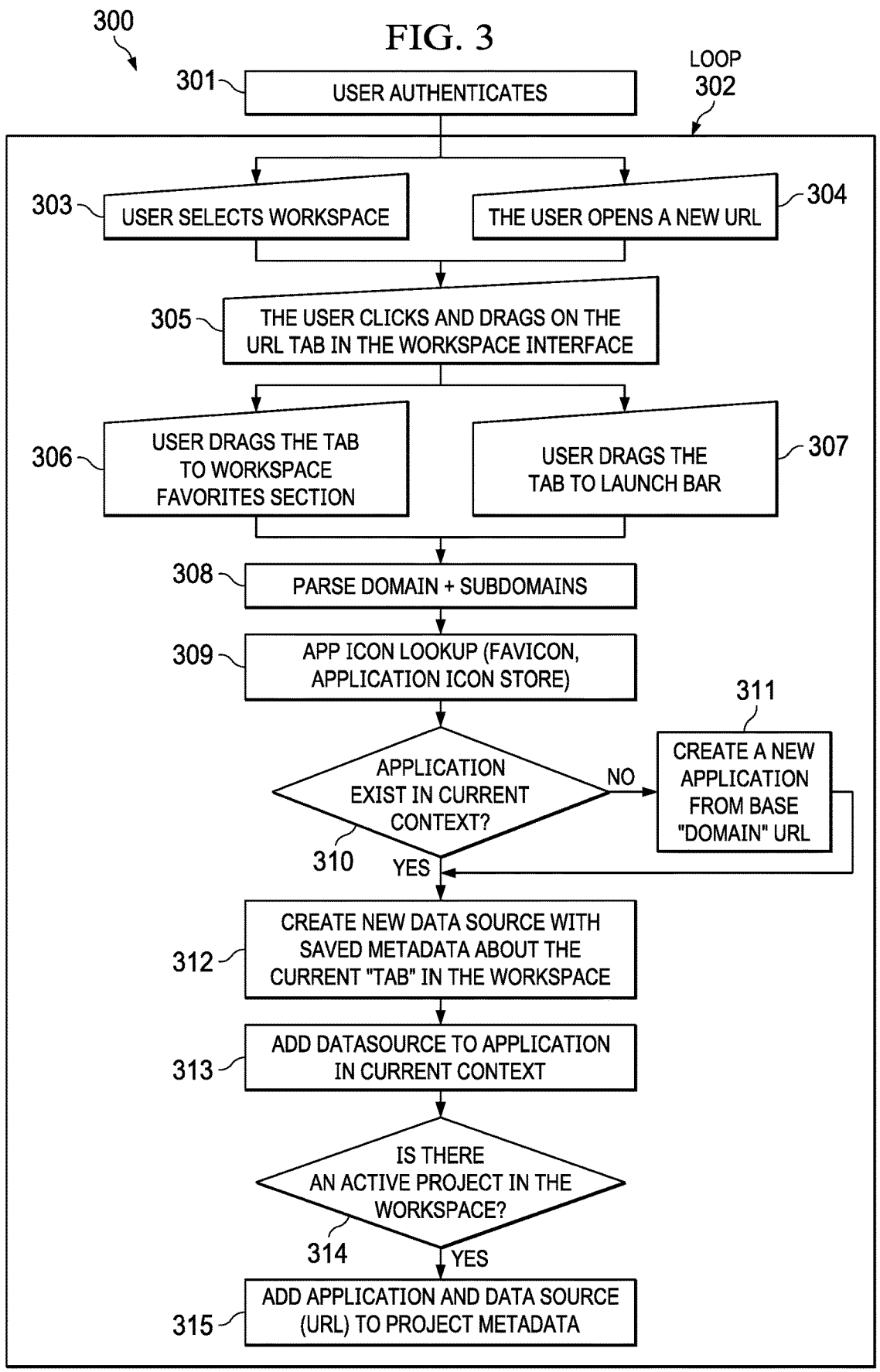
FIG. 3 is a flowchart of an example of a method for providing application management and navigation in a web-based workspace, according to some embodiments.

FIG. 3 is a flowchart of an example of method 300 for providing application management and navigation in a web-based environment. In some embodiments, method 300 may be executed by each portal OS module 204A-N in cooperation with browsers 203A-N running on native OSs 202A-N and orchestrated with state data 207 received from cloud workspace service 206, as each browser 203A-N accesses a different web app provided by web services 208A-N to view or manipulate data sources stored in services 208A-N and/or 209A-N.

Figure 4:
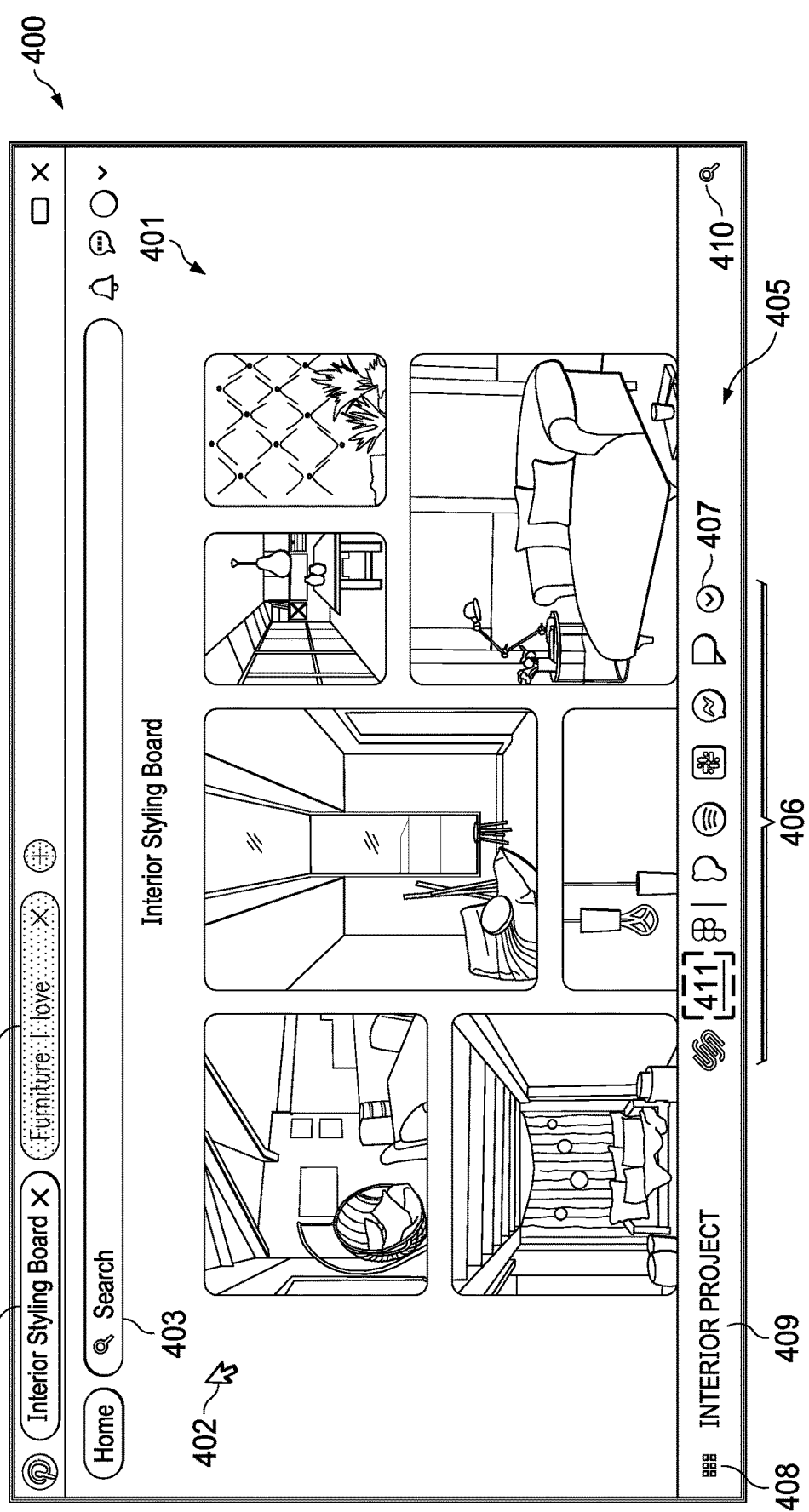
FIGS. 4 and 5 are screenshots illustrating example operations of a method for providing application management and navigation in a web-based workspace, according to some embodiments.
Figure 5:
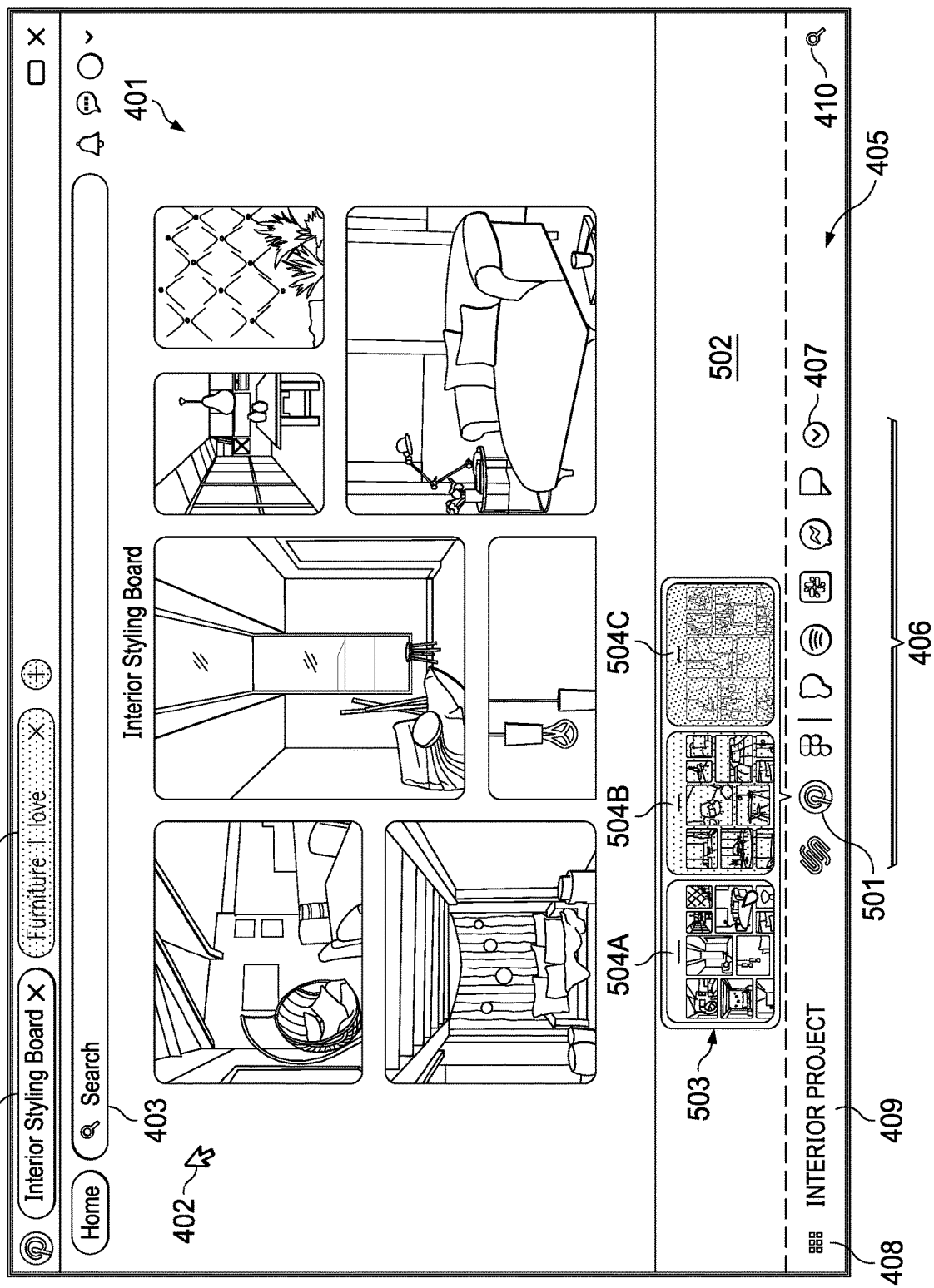

In the description that follows, operations of method 300 are illustrated with respect to screenshots 400 and 500 of FIGS. 4 and 5. Screenshots 400 and 500 show examples of screens or windows rendered by clients 201A-N, at least in part, through the execution of portal OS modules 204A-N to provide a graphical user interface (GUI) usable to implement OS behaviors in a web-based workspace, such as browser 203A-N, which is launched when the user logs into one of clients 201A-N and loads project data.

Particularly, screenshot 400 of FIG. 4 shows web content 401, mouse pointer 402, search or URL address bar 403, tabs 404A and 404B, launch bar 405 having a plurality of web app icons 406 with drop down control 407, management control or task view button 408, project identifier 409, content search control 410, and drag-and-drop area 411. In FIG. 5, screenshot 500 shows preview pane or frame 502 rendering data source link previews 504A-C among preview set 503 associated with web app icon 501.

Returning to FIG. 3, a user authenticates into a workspace or project at block 301, for example, by logging onto one of clients 201-N. The operations of loop 302 may be performed one or more times during a user's session. At 303, the user selects a workspace or project to work on, for example, by launching browser 203A-N, clicking on project identifier 409, selecting an entry on a drop-down menu, etc. Alternatively, the user may enter a URL into search or URL address bar 403 at 304.

In some embodiments, upon authentication 301, a user may be presented with a home screen with recent or recommended web apps to add to a current project's launch bar 405 (or to a favorite set of web apps). Additionally, or alternatively, the user may search for a new web app, web service, or website to add to the current project's launch bar 405. Once a web app is open, pages, documents, or locations associated with the web app may show up as tabs 404A and 404B in window 401.

At 305, the user clicks on tab 404A. At 306, the user drags tab 404A to a favorites section or menu of browser 203A-N. Alternatively, at 307, the user drags tab 404A to drag-and-drop area 411 of launch bar 405. Drag-and-drop area 411 may be dynamically produced between any two web app icons 406 by increasing their spacing as pointer 402 nears them.

In various embodiments, by dragging-and-dropping tab 404A onto launch bar 405, browser 203A-N is configured by portal OS 204A-N to treat the tab's URL, in some respects, as it if were a conventional application running on native OS 202A-N. Particularly, the drag-and-drop action may: (a) save the web app to the user's set of web apps; and (b) associate the specific data source, URL, or file that is displayed in the tab with the saved web app.

At block 308, method 300 may parse and identify tab 404A's domain and subdomain. For example, if the URL of tab 404A is "www.example-app.com/drive/doc/2/58928573992038," the URL may be parsed into a domain portion "www.example-app.com" and a data source portion "/drive/doc/2/58928573992038." At 309, method 300 may look up a web app icon for a web app corresponding to the domain portion of the tab 404A's URL. In some cases, a "favicon" (e.g., a 16×16 pixel icon) may serve as a web app's icon, or a visual mark with which to identify the web app. Additionally, or alternatively, such an icon may be retrieved from a web app icon store or other suitable repository (e.g., using Progressive Web App or "PWA" techniques whereby a web app manifest may contain metadata in a JSON file usable by to retrieve its icon).

At 310, method 300 determines whether the web app already exists in the context of project 409. If the web app already exists in the user's set of current web apps 406 for project 409, then any URL opened inside that web app domain may be added as another data source to the existing web app, for example, with a corresponding link preview. If not, block 311 creates web app icon 501 for the web app of tab 404A using the domain portion of the tab's URL at place 411 in launch bar 405.

At 312, method 300 creates a new data source entry associated with the web app along with saved metadata about the current tab in the workspace. At 313, method 300 associates the data source with the web app corresponding to web app icon 501 in current project 409 or context. At 314, method 300 determines whether there is an active project 409 in the user's workspace. If so, the web app and/or data source are added as project 409's metadata.

From that point on, on hover of web app icon 501, for example, particularly in cases where there is an application integration linked with a user or corporate account, preview pane or frame 502 may be shown with link previews 503 of data sources 504A-C (e.g., documents, locations, etc.) inside the web app. To the end-user, this process may feel like instantiating a conventional OS-based application on native OS 202A-N, without a need to install a program on IHS 100, because web app 501 references a URL which points to a website or service.

As such, method 300 may be used to enable a variety of native OS-like or familiar behaviors in a web-based workspace, such as, for example: searching within a web app for data sources (e.g., recent documents, or URLs within the application offering autocomplete), double-clicking on an existing tab to input search content, clicking on the "plus" button of a tab bar (e.g., next to tab 404B) to create a new web app icon in launch bar 405, on hover of the tab bar the user can see recently viewed data sources to add to the project (e.g., as a new tab), clicking on a tab to activate a data source in browser window 401, right clicking or holding a web app icon to open a web app on a separate window, and clicking on the a new tab button to open a search window, which shows un-opened application data sources from a current project in the results window and also shows recently opened application data sources that are not directly associated with the current project.

On hover of web app icon 501, the web browser may show link previews of project data sources that are associated with the web app (user-saved URLs inside the web app's domain). By clicking on a single data source link preview 504A-C, a new tab may be created within the open web app navigated to that specific data source. If the web app currently does not have any tabs open, it may create application frame 401 and a tab for the data source. By right clicking on the on-hover pop-up, the user may be given the option to open all the web apps data sources. By right clicking on a specific project data source or preview, the user may hide or remove the data source or preview from the project.

In some implementations, link previews 503 of data sources 504A-C of preview pane or frame 502 may comprise different visual features (e.g., highlighting, framing, shading, etc.) that indicate whether a particular frame corresponding to the preview is: open in a foreground (e.g., link preview 504A and tab 404A), open in a background (e.g., link preview 504B and tab 404B), or closed in the current session (e.g., 504C).

The order in which link previews 504A-C are rendered may be selected based upon context information (e.g., a type of IHS, a posture of the IHS, a location of the IHS, an identity of a user, a proximity of the user with respect to the IHS, etc.). For example, when a user operates a tablet device, one or more of link previews 504A-C may correspond to hand drawing (e.g., with a stylus) content, whereas when the user operates a laptop, one or more of link previews 504A-C may correspond to text content. Moreover, launch bar 405 may be associated with and configured specifically for project 409. The order in which web app icons 406 appear in launch bar 405 may also be based upon the same or different context information.

Managing Projects and Organizing Activities in a Web-Based Workspace

Today's workforce may spend significant time working on the web, which gives rise to a host of problems. For example, with conventional web apps, there are no tools for keeping activities with a common goal or purpose bundled together, making it difficult to organize work, especially collaborative work in a team. It is also not conventionally possible to add collaborators to a project involving multiple web apps, or to manage permissions, calendars, budgets, services, and to-do lists on a per-project basis, which often results in users not keeping track of what they are working on, because projects are not separated or organized.

To address these, and other concerns, systems and methods described herein enable managing projects in a web-based workspace, such as web browsers 202A-N. In some implementations, a user may open into a project identified by project identifier 409. A project may group activities (e.g., web apps) and it may retain its state across sessions and devices, for example, via cloud workspace service 206. Moreover, a project may also enable a user to manage access or permissions, add calendars, to-do lists, storage services, etc.

In some embodiments, a project may include multiple web browser tabs usable for a common goal or purpose. For instance, a website that a user is working on that requires multiple web apps to be build may be a project, and a collection of the user's favorite TV shows may be another project. Generally, a project may be created by zooming out the workspace into a task view that shows all open tabs. A task view may be entered, for example, with a gesture, a key-combo, or via management control or task view button 408. By providing a name to the collection of tabs, the user may create a new project.

A project may have its own identity (e.g., desktop color, name, tile, etc.). A color palette may be selected or derived from the most accessed or used media, for example, as the most prevalent (or "key") color, as an average color of images in the project, etc., and it may be changed by the user. A workspace color palette may be based on the key color and automatically composed to ensure usability. In that way, the project's identity makes it easy for users to know what project they are currently in, and it helps recognize different projects in task view, where a user may switch projects by clicking on a project's tile. In addition, a project may include metadata for searchability.

Project resources (e.g., shown in team resources panel 1204 of FIG. 12) are services that can be linked to a project. These services may be available in a user or corporate profile—with an account for such services—to help with organization and to keep a project's team members on the same page. When a resource is added, a new record (e.g., storage folder, canvas, calendar, etc.) may be created, all team members may be granted access, and usage/cost may be tracked. Moreover, when a proprietary or existing communication channel is added (e.g., ZOOM, etc.), video chat may be invoked by selecting a team member in a communication panel and starting a session; a video conferencing window or panel may be rendered in a frame that can be moved around inside the workspace.

In some implementations, a team member may toggle a "follow me" feature. All team members may have access to all items in a project, and the leader's tabs may be displayed (e.g., open and closed) in other team member's workspaces so they can follow what the leader is doing across apps. In addition, users may be able to toggle a "show collaborators" feature for individual web apps with that capability, so everyone in a project or session can follow a team leader along inside the web app.

Figure 6A:
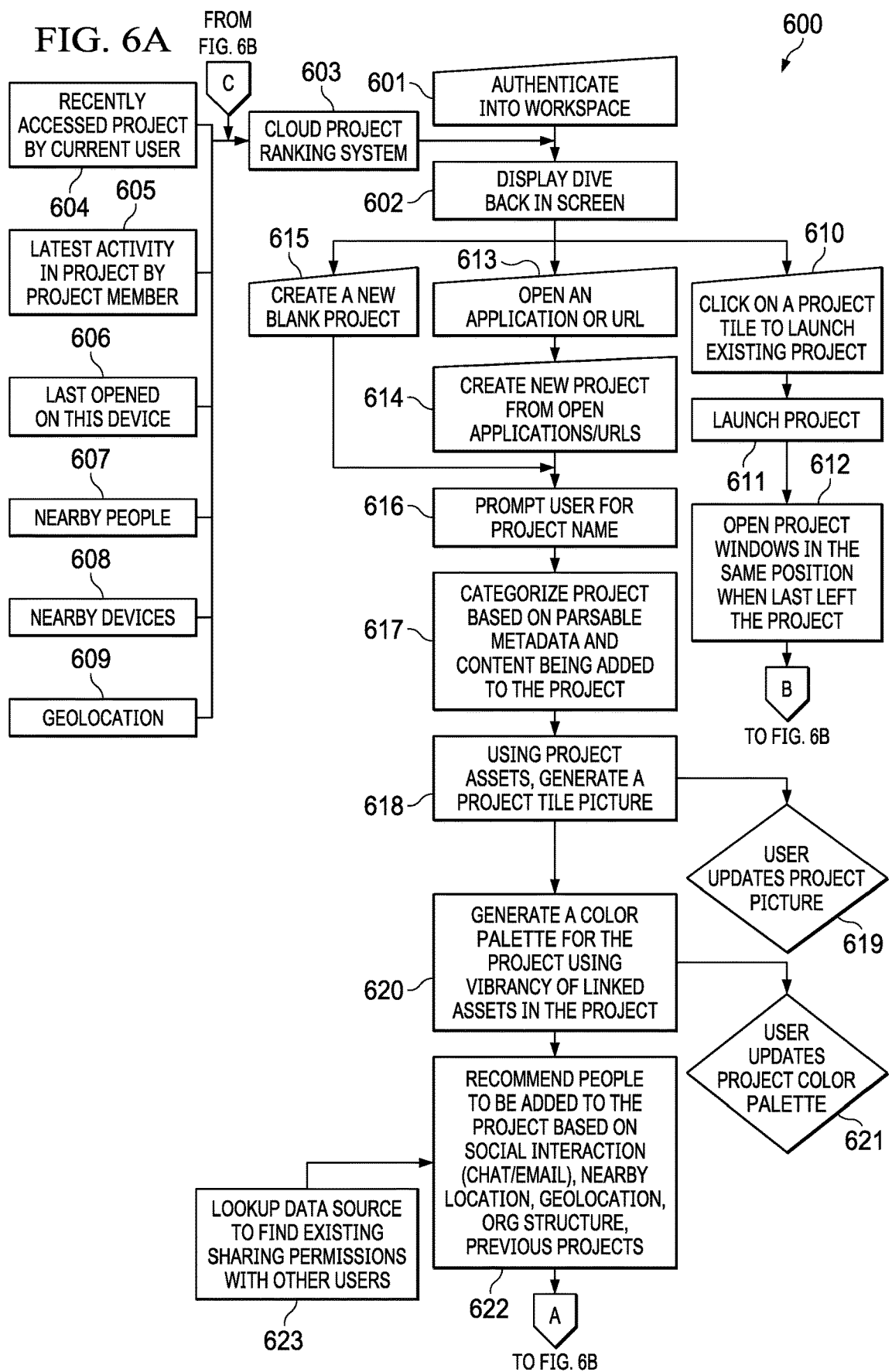
FIGS. 6A and 6B are flowcharts of an example of a method for managing projects in a web-based workspace, according to some embodiments.
Figure 6B:
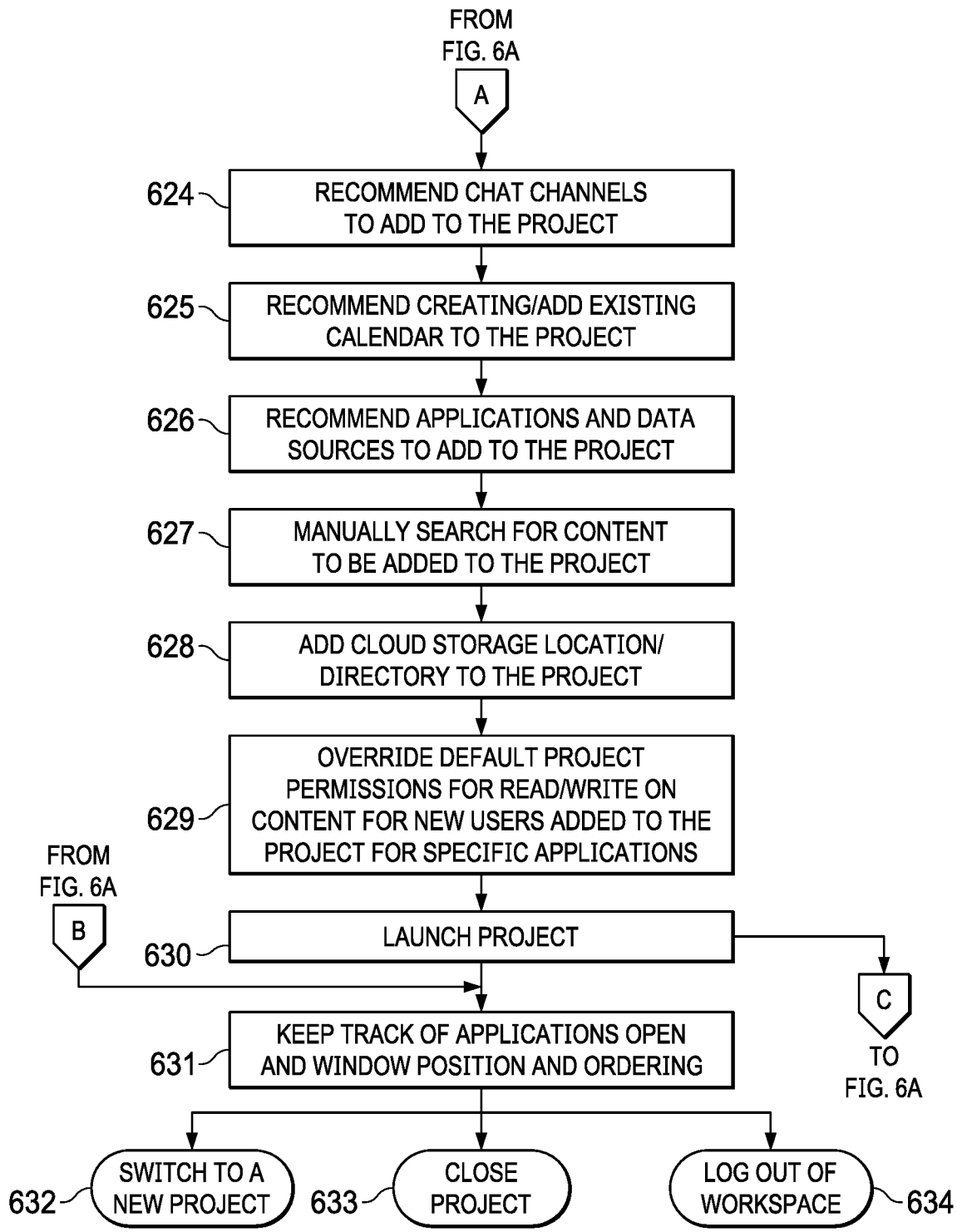
Figure 7A:
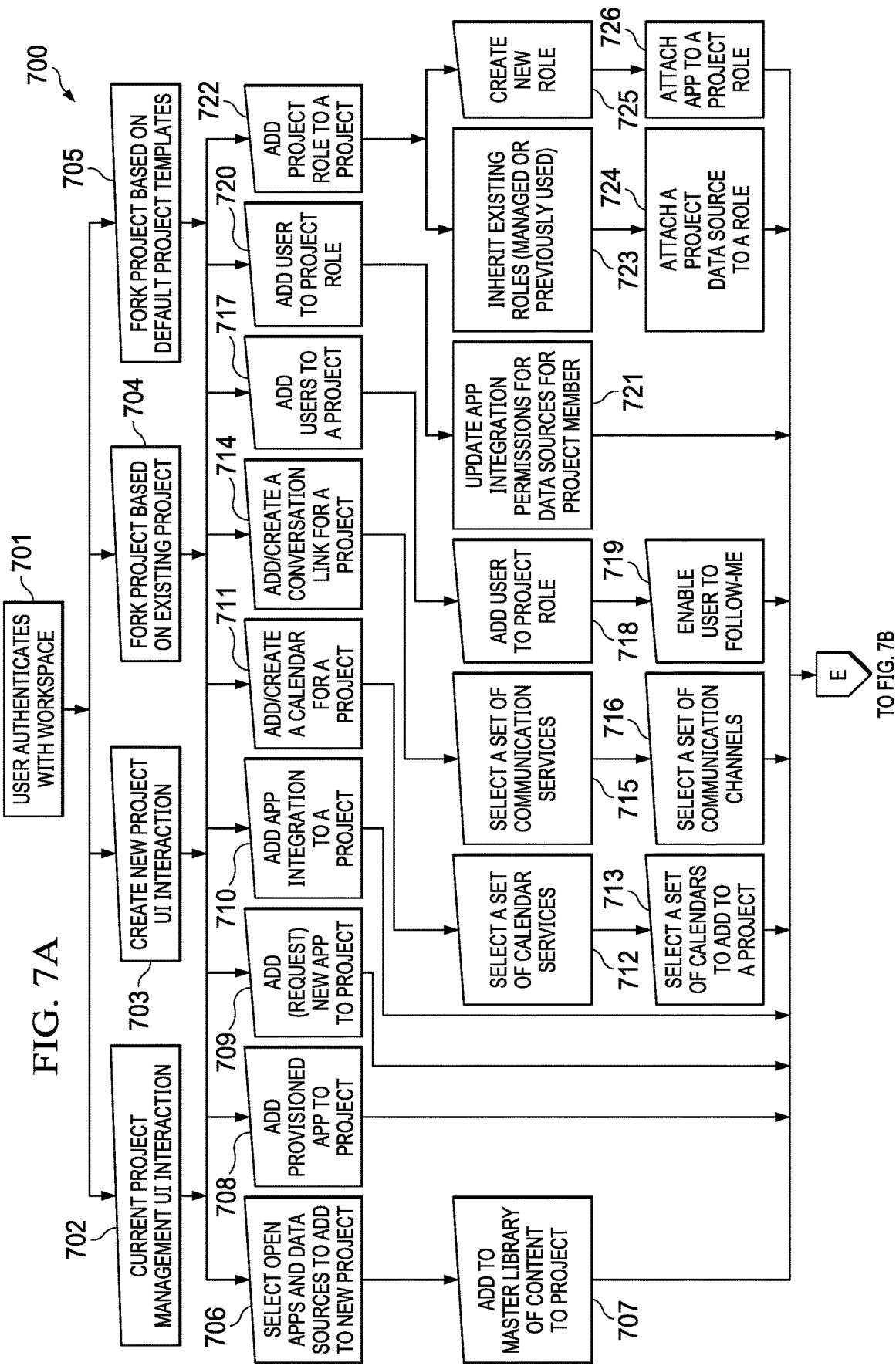
FIGS. 7A and 7B are flowcharts of an example of a method for organizing activities in a web-based workspace, according to some embodiments.
Figure 7B:
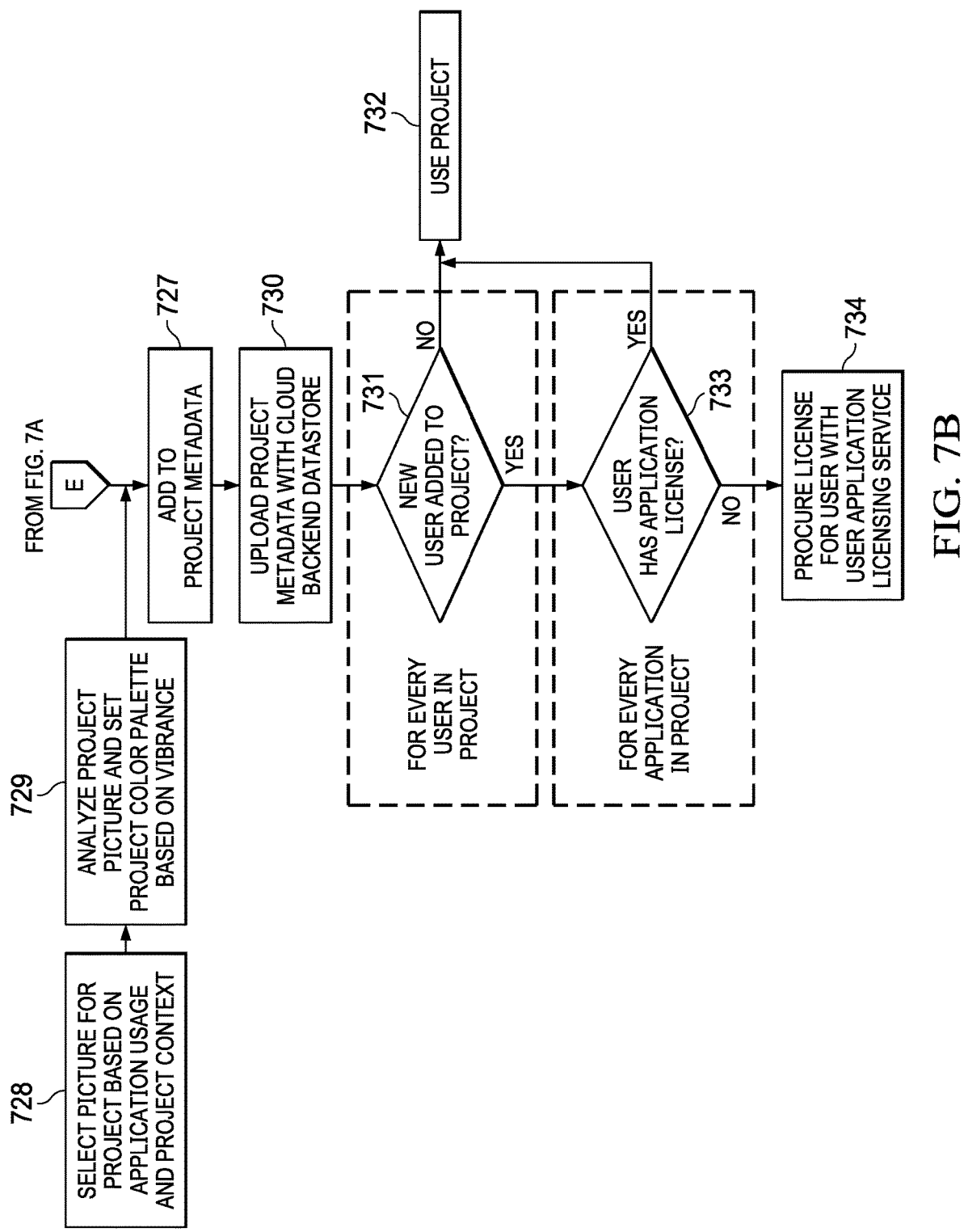

FIGS. 6A and 6B are flowcharts of examples of method 600 for managing projects in a web-based workspace, and FIGS. 7A and 7B are flowcharts of examples of method 700 for organizing activities in a web-based workspace. In some embodiments, methods 600 and 700 may be executed by portal OS modules 204A-N in cooperation with web browsers 203A-N running on native OSs 202A-N and orchestrated with state data 207 received from cloud workspace service 206, as each browser 203A-N accesses a different web app provided by web services 208A-N to view or manipulate data sources stored in services 208A-N and/or 209A-N. In the description that follows, operations of methods 600 and 700 are illustrated with respect to screenshots 800-1300 of FIGS. 8-13B.

Particularly, method 600 of FIGS. 6A and 6B describes the creation and/or management of projects. Method 600 begins when a user (e.g., a project leader or team member) authenticates into a workspace (e.g., a web browser, a web portal, etc.) at block 601, for example, by logging onto one of clients 201-N. At 602, browser 203A-N displays a "dive back in" screen, a splash screen, or a task view (e.g., screenshot 900 of FIG. 9), for example, in response to a user's selection of management control or task view button 408.

At 603, method 600 ranks existing projects for display to the user (e.g., by ordering project tiles 901 and 802 in FIG. 9 in the task view 900), for example, based upon most recently accessed projects by the user 604, latest activity in a project by a team member 605 (e.g., recent team activity panel 1203 in FIG. 12), last opened project in the currently used IHS 201A-N, nearby users 607, nearby devices 608 (e.g., IHSs 201A-N), geolocation 609, or other contextual information (e.g., a type of IHS, a posture of the IHS, a location of the IHS, an identity of the user, and a proximity of the user with respect to the IHS).

At 610, the user may click on a project tile shown in the task view to launch an existing project, and at 611 method 600 may launch the selected project at least in part, by opening project windows or tabs in the same position they were left in the last session at 612. Alternatively, at 613 the user may open a web app or URL (e.g., in a browser tab) and at 614 method 600 may create a new project from the open web apps or URLs. Alternatively, at 615, the user may choose to create a blank project.

Figure 8:
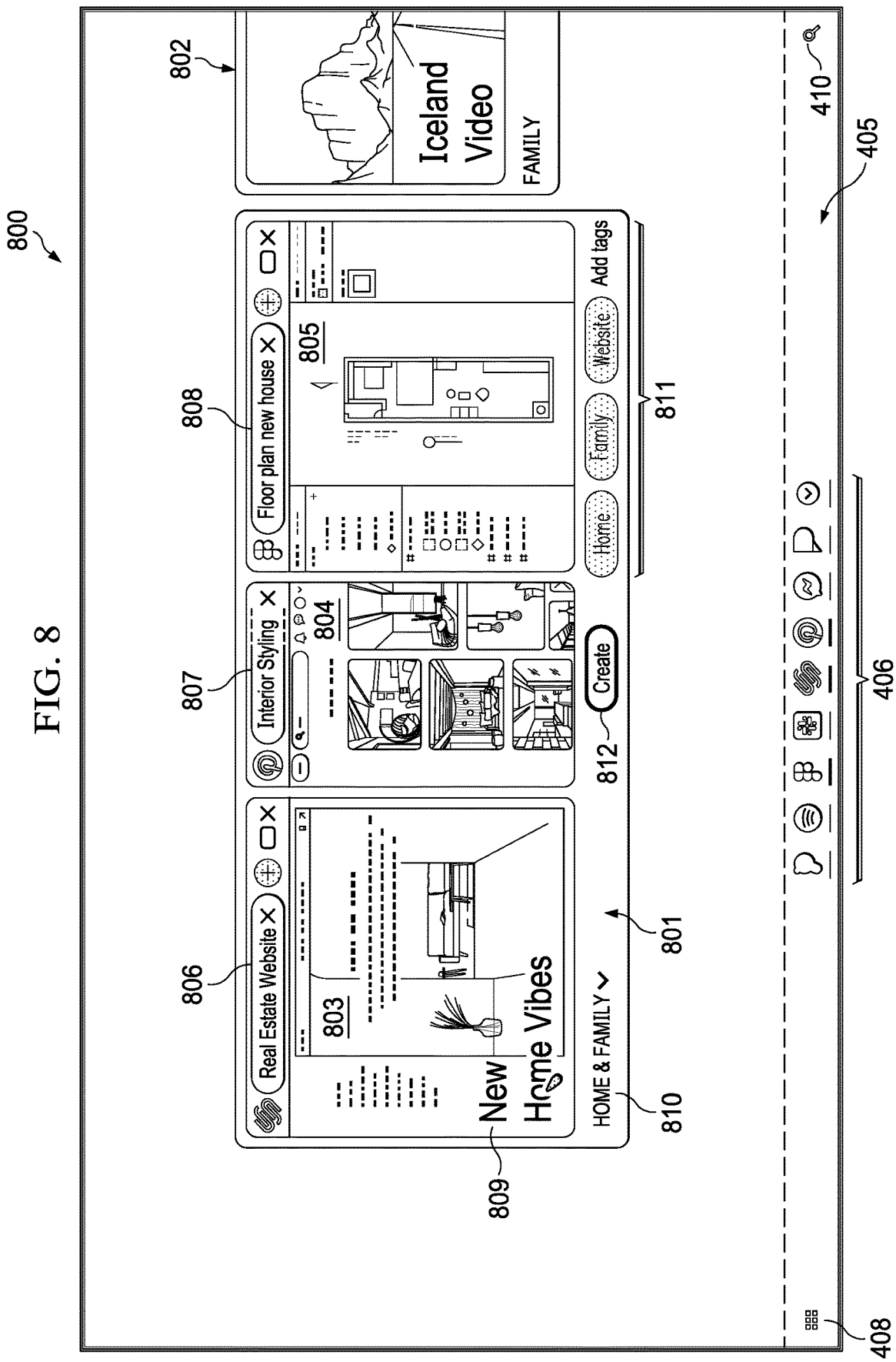
FIGS. 8-12 are screenshots illustrating example operations of methods for managing projects and organizing activities in a web-based workspace, according to some embodiments.
Figure 9:
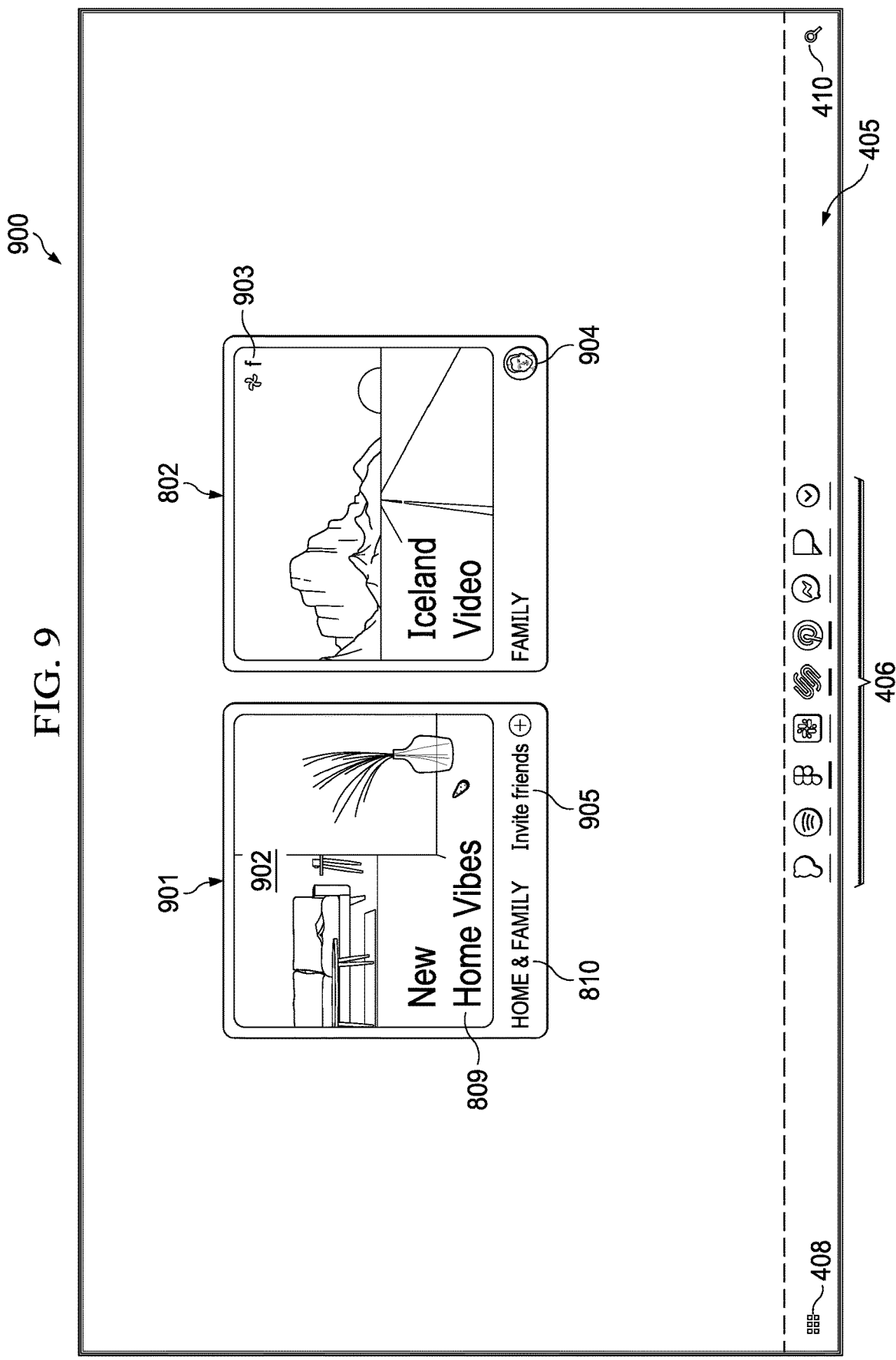

Screenshot 800 of FIG. 8 illustrates aspects of the process of block 614, where the user creates new project 801 from the open web apps or tabs 806-808. In some cases, prior to clicking on management control or button 408, one or more of tabs 806-808 may have been displayed in the foreground (e.g., tabs 806 and 807) and a remainder in the background (e.g., tab 808) of web browser 202A-N. Each of tabs 806-808 includes its respective web app content 803-805, which may have been reduced in size in response to the user clicking on management control or task view button 408, and framed into initial project overview 801, next to project tile 802 for an existing project ("Iceland Video").

Still referring to method 600, at 616, the user may be prompted for and enter project name 809 (e.g., "New House Vibes"). At 617, method 600 may categorize a project (e.g., "Home & Family" 810) based on parsable metadata and content 811 being added to the project, as selected by the user.

At 618, method 600 may generate a project tile 901 using image 902 selected as a representative image among the project's assets (e.g., the largest image, the most used image, the most repeated image across tabs 806-808, etc.), and at 619 the user may update or change the project tile's picture. At 620 method 600 may generate or select a color palette for the project, for example, using the vibrancy of linked assets or images in the project, a key color, or an average color of assets, etc. At 621, the user may update the project's color palette.

The color palette may be used in project tile 901, in the project's frames or browser tabs, and/or as a background color of browser 202A-N. In various implementations, project tile 901 of screenshot 900 may be created in response to the user clicking on "create" button or control 812 of screenshot 800. As such, project tile 901 may include the selected image 902, the color palette, project name 809, and project category 810.

In some cases, a project tile (e.g., 802) may include web app icons 903 that correspond to the resources of that project's URLs. If a team member is added to a project, a representation, picture, or avatar 904 associated with them may also be added to the corresponding project tile (e.g., tile 802). For newly created project tile 901, button or control 905 may allow the user to add or invite other team members or friends to participate in the project may be displayed.

Figure 12:
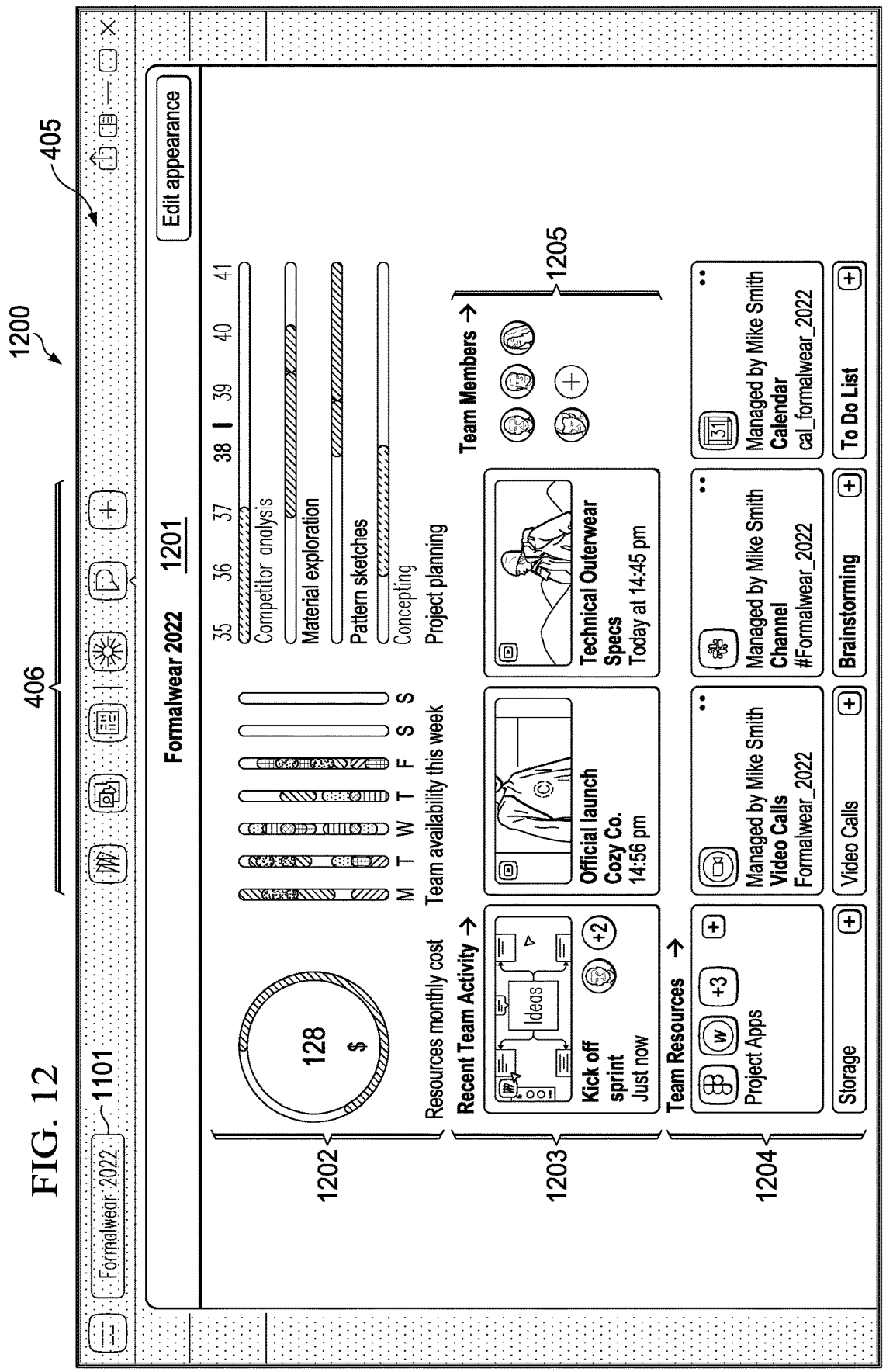

At 624, method 600 may recommend chat (e.g., SLACK, WHATSAPP, MICROSOFT TEAMS, etc.) or other communication channels (e.g., ZOOM, WEBEX, etc.) using a machine learning algorithm (within portal OS 204A-N and/or cloud workspace service 206) to add to the project (e.g., via team resources panel 1204 of FIG. 12). At 625, method 600 may recommend creating or adding an existing calendar to the project (e.g., via project management or tool panel 1202 or team resources panel 1204 of FIG. 12). At 626, method 600 may recommend web apps and data sources to add to the project, for example, including adding or removing web app icons to launch bar 406 (or via team resources panel 1204 of FIG. 12).

At 627, method 600 may allow the user to manually search for content to be added to the project. At 628, method 600 may add cloud storage services, locations, folders, or directories to the project (e.g., using team resources panel 1204 of FIG. 12) to which all saved data is stored (e.g., in a folder with the name of the project). In some implementations, method 600 may default to a storage service that is associated with an enterprise account, for example, and by creating a storage location for a project the enterprise may track how much resources each project uses. At 629, method 600 may override default project permissions for read-write on content for new users added to the project for specific web apps (e.g., via team members panel 1205 of FIG. 12).

Figure 10:
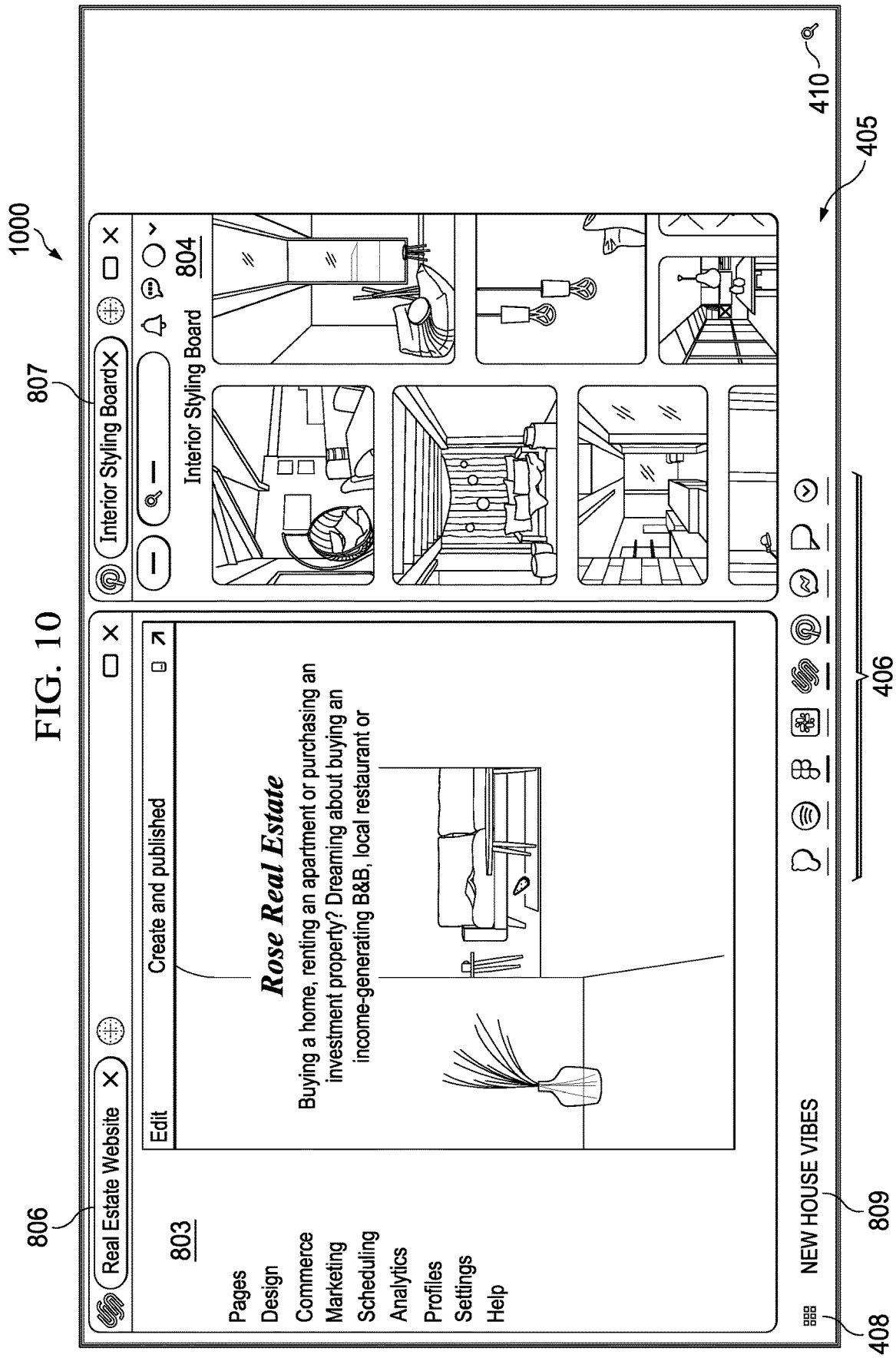

At 630, method 600 may launch the newly created project. Screenshot 1000 of FIG. 10 shows an open project corresponding to tile 901. Particularly, in response to the user clicking on tile 901 in task view 900, foreground tabs 806 and 807 are loaded with their respective URL content 803 and 804 in a browser window, and launch bar 406 displays web app icons associated with the "New House Vibes" project 809. Background tab 808 may also be open, but not shown.

At 631, method 600 may keep track of web apps open in the foreground or background of browser 203A-N, and the position and ordering of windows, frames, or tabs. In some cases, the current state of the project may be saved (e.g., periodically, upon changes, upon log out, etc.) and retrieved from (e.g., upon authentication, project launch, etc.) state database 207 by cloud workspace service 206.

At 632, the user may switch to a new project. Additionally, or alternatively, the user may close the project at 633. Additionally, or alternatively, the user may log out of the workspace, browser, or portal at 634.

Figure 11:
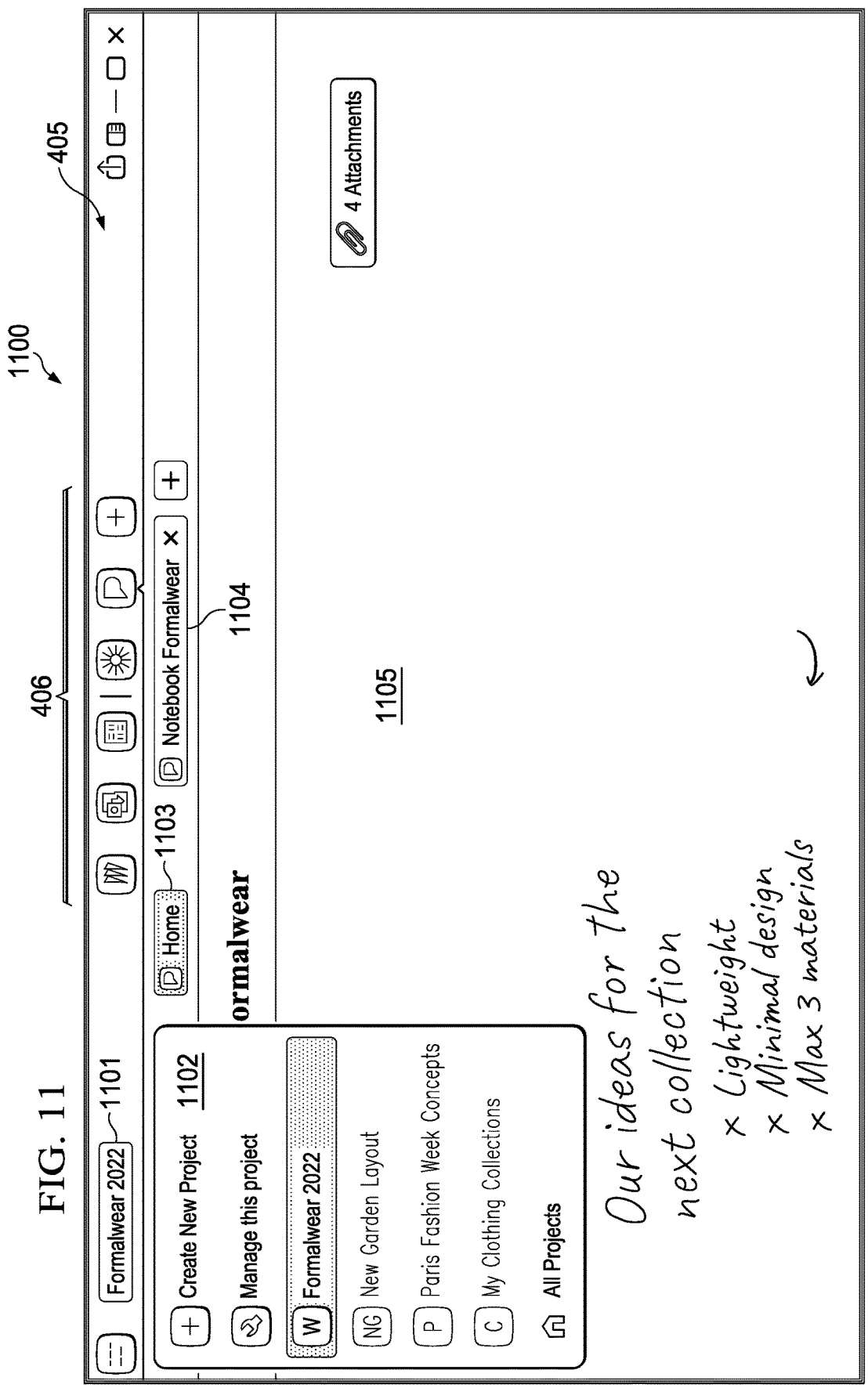

Screenshot 1100 of FIG. 11 shows an alternative interface provided by portal OS 204A-N for managing projects. Specifically, launch bar 405 and web app icons 406 are shown at the top of the browser's window. Project control 1101 combines aspects of management control 408 with project labels, such that by clicking on control 1101, drop-down menu 1102 appears that enables a user to create a new project, manage the currently open project, select a recent project (e.g., Formalwear 2022"), view a list of all projects, etc. In response to the user selecting a given project, the project is launched in window 1105 (in this case, a note taking web app), with tabs 1103 (open in the background) and 1104 (open in the foreground).

Method 700 of FIGS. 7A and 7B relates to the organization of project activities. In method 700, the user again authenticates into a workspace (e.g., a web browser, a web portal, etc.) at block 701, for example, by logging onto one of clients 201-N. In various embodiments, one or more of the following operations may be performed by a user (e.g., a team leader of a given project) using user interface (UI) 1201 of screenshot 1200 of FIG. 12. Initially, at 702, the user may perform a project management interaction 702, create a new project UI interaction 703, fork or split a project based on another, existing project 704 (e.g., using a subset of one or more tabs in the original project), or fork or split a project based on project templates 705.

At 706, the user may select open web apps and data sources to add to a new project, and at 707 method 700 may add content to a master library for the project. At 708, the user may add provisioned web apps to an existing project, for example, using team resources panel 1204. At 709, the user may request a new web app to add to the project.

At 710, the user may add a web app integration to the project. At 711, the user may create or add a calendar, budget tracker, projected timeline, or to-do list to a project, for example, using project management or tool panel 1202. At 712, the user may select a set of calendar services, budget tracking services, projected timeline services, and/or to-do services, and at 713 the user may select a set of calendars, budget tracker, projected timeline, and/or to-do list to add to the project. At 714, the user may add or create a conversation link for the project, for example, using team resources panel 1204. At 715, the user may select a set of communication services, and at 716 the user may select a set of communication channels to add to the project.

At 717, the user may add other users to the project using team member panel 1205. At 718, the user may select a role for the other users (e.g., team member, team leader, etc.). At 719, the user may enable a "follow-me" feature. At 720, the user may select a role for an existing user(s), and at 721 the user may update permissions for data sources for the existing user(s).

At 722, the user may add a project role to the project. A project role may describe the role of a person in a project, such as, for example: engineer, designer, manager, etc. Each project role may be associated with a set of web apps, which may be made available in a corresponding user's workspace. Project roles may be specific to a project. A project admin role is the highest role in that project and can add and remove content, people, and manage applications for the project. Different roles may be assigned to general users in the project (e.g., software dev, architect, design, core team, presenter, temp, etc.) and may be fully customizable. In some cases, different application access may be attached to each role federated through a backend to link user accounts with specific application user accounts (e.g., SLACK integration may link the "portal OS" user account with a v user account and modify permissions and set roles from Portal OS).

At 723, the project may inherit one or more existing roles, and at 724 method 700 may attach a project data source to a role. Alternatively, at 724, the user may create a new role for the project, and at 726 the user may attach a web app to the project role.

At 728, the user may select an image for the project based upon web app usage and/or project context. At 729, method 700 may analyze the project image and set a project color palette based on vibrance, predominant image color, etc. At 727, method 700 may add the image and the color palette, as well as new tags, to the project's metadata. Then, at 730, method 700 uploads the project metadata to state database 207 via cloud workspace service 206.

At 731, for every user in the project, method 700 determines whether a new user has been added. If not, block 732 enables the user to work on the project. If so, for every web app in the project, block 733 determines whether the user has a license or is otherwise authorized to use the app. If not, block 734 procures a license for the user with a licensing service. If so, control returns to block 732.

As such, using systems and methods described herein, a project may be created and managed that includes a set of bookmarks or a collection of URLs with a name, and that provides users the ability to add (linked and native) services such as: calendars, emails, notes, communication channels, storage, task tracking services, project management solutions, collaborators, chat, follow-me features, etc.

Different projects may have their own distinct look and feel. In some cases, different projects may be associated with each other or grouped together, and/or a user may create sub-projects. These systems and methods may also be implemented to manage users of a project and entitlements associated with data sources and applications within a project, to manage user license by adding collaborators to a project, and/or to create a master library of digital assets.

Assisting Users in a Web-Based Workspace

As a user begins to work in a web-based workspace, the workspace may manipulate a set of unconnected data from $3^{rd}$ party application providers. To build a connected graph of a user's personal work data and shared work data, systems and methods described herein may process the current context of the web-based workspace and provide an assisted workflow to access to that data. Particularly, to improve the user interaction of finding relevant data at a given time, these systems and methods may infer the most relevant set of assistive interactions at that given time based upon the user's graph of data across cloud systems.

Assistive interactions may provide access to the user's data stack from connected web apps via an API. Once the user's connected graph is obtained, systems and methods described herein may produce a recommendation and ranking to provide data interacted with based on the user's historical behavior and/or other users.

In some embodiments, when a user launches a project, systems and methods described herein may extract metadata about currently open URLs, web apps, application and window placement, device location, peripherals connected, and other context information. Upon the launching of a project, these systems and methods may continue to collect data about the current context of the user in the workspace and in the current set of open web apps, and may take a snapshot of that context. The current context may then be fed into a recommendation and ranking module on the client (e.g., within OS portal 204A-N) or online (e.g., within cloud workspace service 206), which may make one or more inferences based on context snapshots.

The output of the recommendation and ranking module may include a vector of workspace metadata or the like.

Systems and methods described herein may then match an UI template to the vector output of ranked metadata and content cards. Content cards may be displayed in an assist bar or panel on the side of a browser window, for example, in response to a command or gesture. Upon interaction with content cards, these systems and methods may provide feedback system to the recommendation and ranking system for future rank and content selection modifications.

As used herein, the term "card" refers to a frame displayed inside of an assist panel, frame, or window. Each card runs a process that leverages corresponding web-apps by using APIs to collect and display information from corresponding web apps or services. Information collected for each card may be based on instructions from an assistant engine. For example, a document card may look for relevant documents across all associated cloud storage services. The assistant engine may track user activity and context to inform the document card what to look for. Other types of cards may include, but are not limited to: inspirational content, articles, news, conversations, calendars, weather, people, health, screen time, clipboard, events, shows, films, entertainment, games, web query, search results, reminders, to-dos, help, etc.

In some cases, when a card is created, a predominant color from the image used to create the tile of the current project (e.g., used to create the color palette for project tile 901) may be applied to the card. Additionally, or alternatively, image (s) representative of the content or a card may be used to create a color scheme for that card.

In some cases, one or more cards may be shared across users or team members of a project, in which case shared cards may appear in the other users' assist panels. A user may publish a card to the public, to all members of a project, or to a particular user. In some cases, publishing or sharing a card may involve dragging-and-dropping the card to a representation, avatar, or icon of the other user, group of users, project, etc. In other cases, a user may request to view a card (e.g., inspiration wall, clipboard, weather, etc.) belonging to another user. For example, yet other types of cards may include a profile card, personal drop box, creative space, or shared space that allows other users to see where the user is located, what the weather is like, their thoughts, latest photos, etc.

Figure 13A:
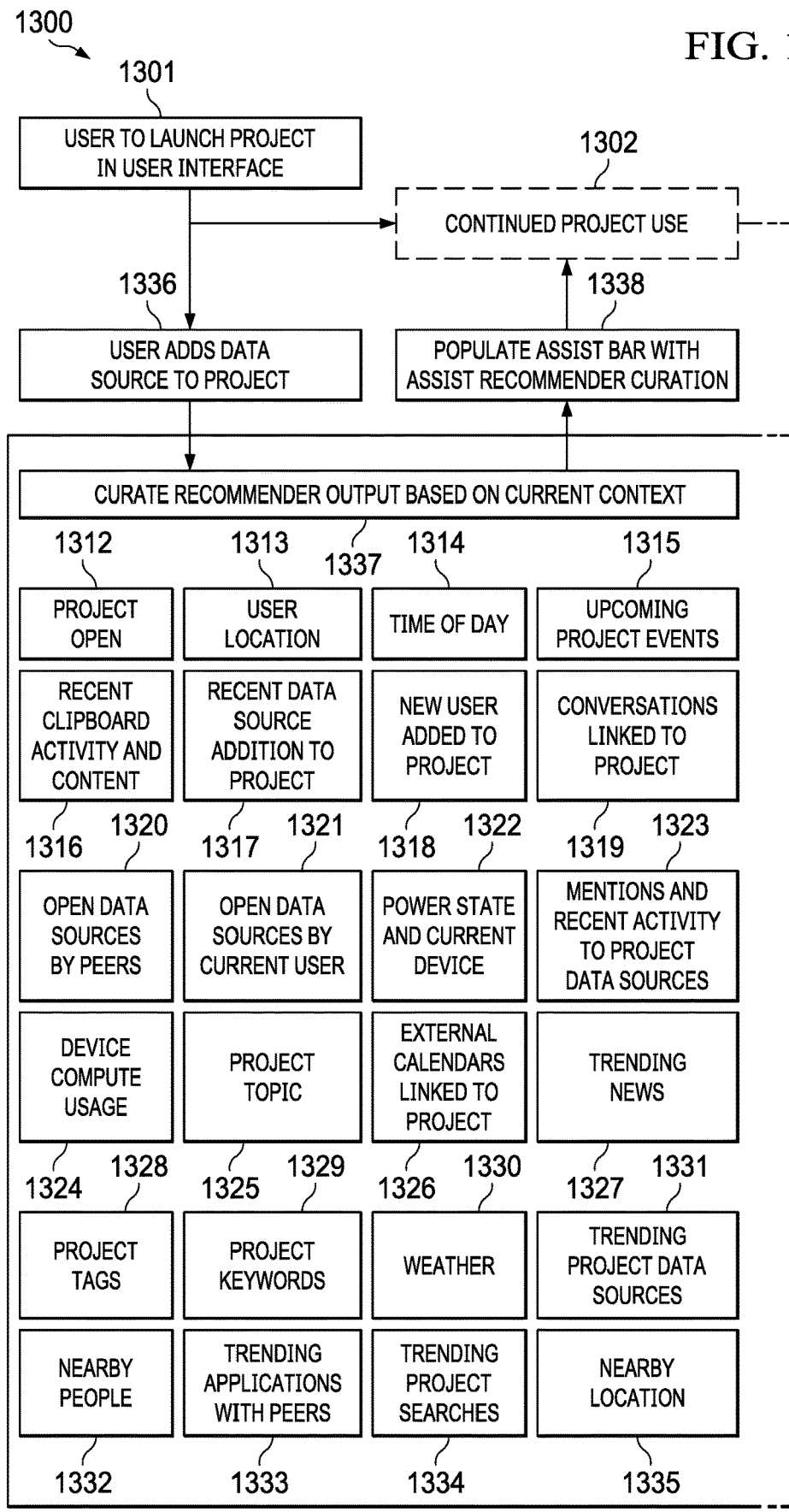
FIGS. 13A and 13B are flowcharts of an example of a method for assisting users in a web-based workspace, according to some embodiments.
Figure 13B:
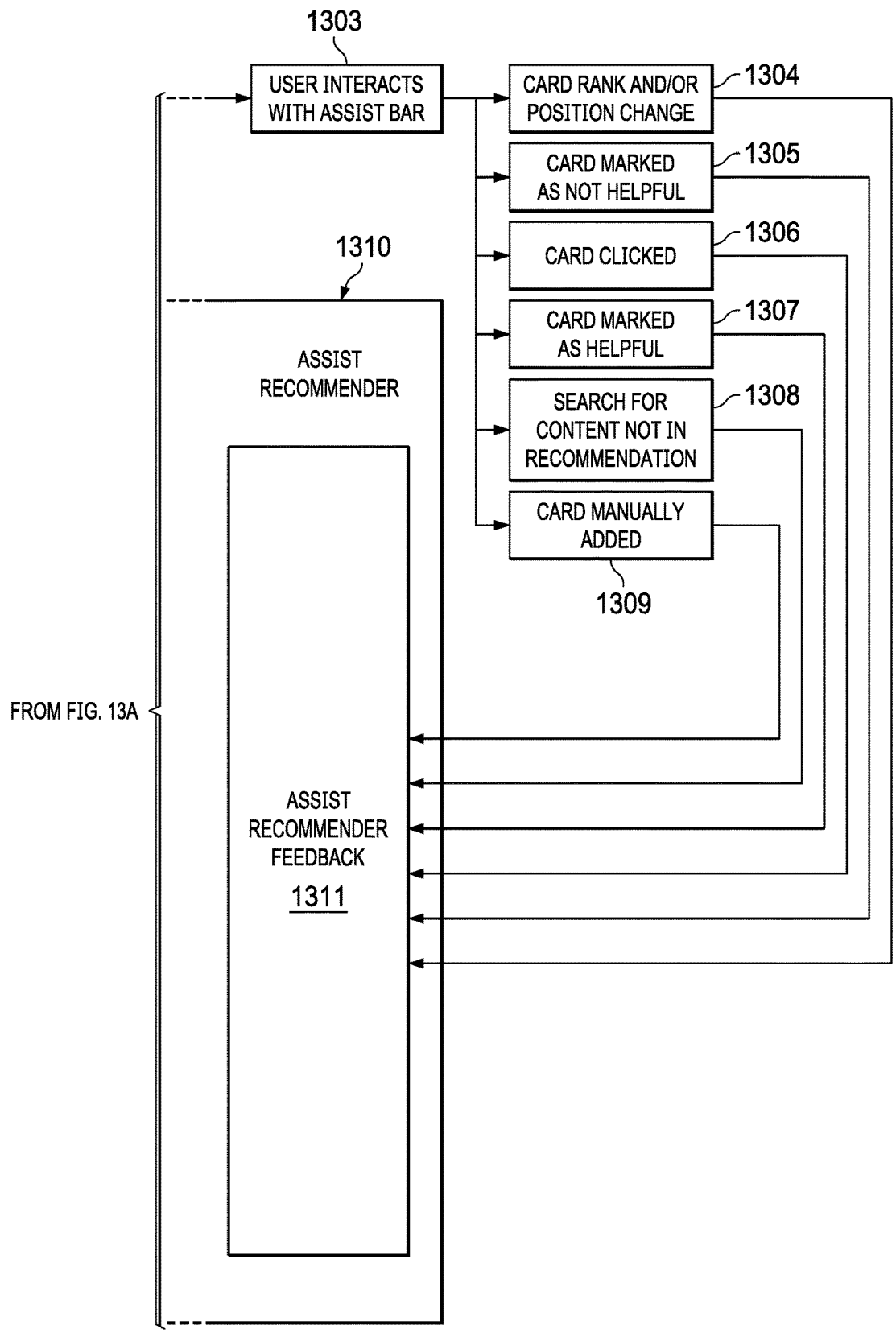
Figure 14:
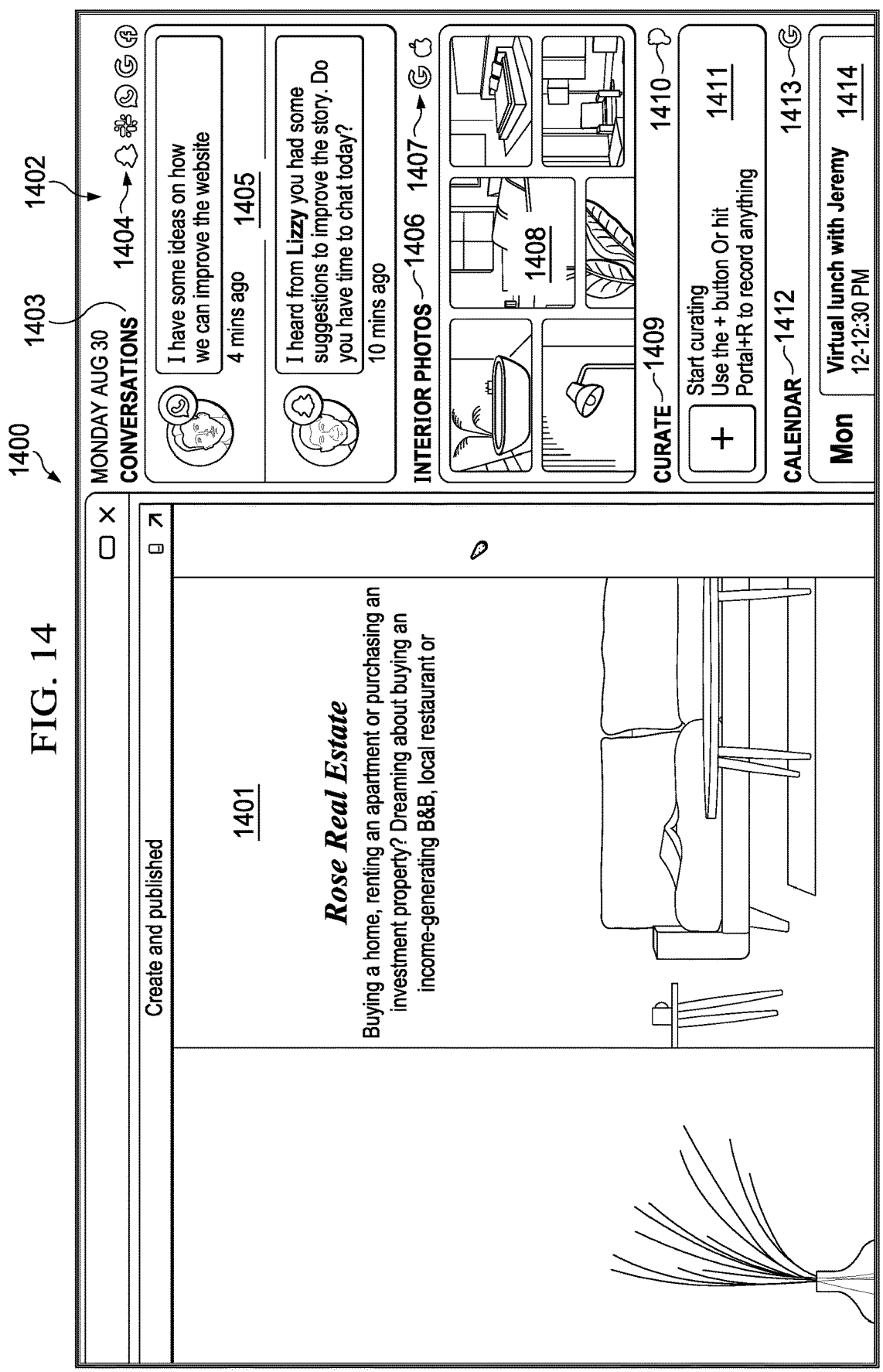
FIGS. 14-19 are screenshots illustrating example operations of a method for assisting users in a web-based workspace, according to some embodiments.

FIGS. 13A and 13B are flowcharts of an example of method 1300 for assisting users in a web-based workspace. In some embodiments, methods 1300 may be executed by each portal OS module 204A-N in cooperation with web browsers 203A-N running on native OSs 202A-N and orchestrated with state data 207 received from cloud workspace service 206, as each browser 203A-N accesses a different web app provided by web services 208A-N to view or manipulate data sources stored in services 208A-N and/or 209A-N.

At 1301, the user launches a project via browser 203A-N and continues to use the project at 1302. At 1303, the user invokes and interacts with an assist bar or panel, and OS portal 204A-N. For example, the user may allow a mouse pointer to hover near the right edge of the display, perform a swiping gesture, or press a key on a keyboard to invoke the assist panel.

As the user interacts with the assist panel, OS portal 204A-N collects a representation of the user's activities, such as, for example: a card rank or position change 1304 (e.g., by drag-and-drop a card to a different position), a card marked as not helpful 1305, a card clicked 1306, a card marked as helpful 1307, a search for content not yet recommended 1308, a card manually added to the assist panel 1309, etc. This information is then provided as feedback 1311 to assist recommender 1310.

In various implementations, assist recommender 1310 may include a deep neural network recommendation engine, or the like. Assist recommender 1310 may be part of OS portal 204A-N and/or it may be provided by cloud workspace service 206. Particularly, assist recommender 1310 may include a semantic engine that looks at selected items to understand user intent to determine needs for reference material for a current task, such as: URLs, active URLs, foreground URLs or tabs, background URLs or tabs, web app, web app content, time of day, location, weather, IHS 100 usage, project topic, project keywords, number and/or identities of team members in the project, etc.

Assist recommender 1310 may also include a pattern discovery engine that looks at activity over time to understand behavioral patterns to make predictions of what the user may need, such as URL activity and content patterns, location patterns, power state, calendar, etc. In addition, assist recommender 1310 may include an activity monitor that looks at the user's activity to understand what the most relevant content and/or conversations are, such as: mentions, chat or conferencing activity, most accessed content or URLs, most recent content or URLs, trending topics or news on the web, etc.

When the user adds a data source, tab, or web app to a project at 1336, the newly added data source is also provided to assist recommender 1310. Assist recommender 1310 then curates an output based on current context at 1337 and populates the assist bar or panel with the results of the curation at 1338 while the user continues to work on the project at 1302. As such, assist recommender 1310 may determine what kind of information is most valuable to a user based upon their activity and community activity.

In some cases, each card output by assist recommender 1310 may be associated with one or more predefined categories, such as: communications, documents, calendar, to-do list, photos, etc. In other cases, an option (e.g., a toggle or button) may be provided for the user to select a "focus" option such that the output of assist recommender 1310 is at least temporarily based exclusively on their individual activities, and not based on community activities.

Examples of data usable by assist recommender 1310 to generate its output at 1337 include, but are not limited to: open project 1312, user location 1313, time of day 1314, upcoming project events 1315, recent clipboard activity or content 1316, recent data source addition to the project 1317, new user added to the project 1318, conversations linked to the project 1319, open data source by peers or team members 1320, open data sources by the user 1321, power state and current device identity 1322, mentions and recent activity to project data sources 1323, device compute usage 1324, project topic 1325, external calendars linked to the project 1326, trending news 1327, project tags 1328, project keywords 1329, weather 1330, trending project data sources 1331, nearby people 1332, trending applications with peers or team members 1333, trending project searches 1334, nearby locations 1335, etc.

FIGS. 14-19 are screenshots illustrating example operations of method 1300 for assisting users in a web-based workspace. In screenshot 1400 of FIG. 14, to open assist panel 1402 next to browser window 1401 displaying a current project, the user may issue a command (e.g., a keystroke, keystroke combination, button click, etc.), perform a gesture (e.g., swipe from right to left), or let a mouse pointer hover near the right edge of window 1401. In this case, in response to the command, gesture, or event, assist panel 1402 is produced with summary of conversation content 1405 displayed in conversation card or category 1403, summary of photos 1408 displayed in photos card or category 1406, curate control 1411 displayed in curate card or category 1409, and summary of calendar entries 1414 displayed in calendar card or category 1412.

Moreover, conversation card or category 1403 includes icons 1404 representing one or more web apps in the current project from which conversation content 1405 is retrieved, photos card or category 1406 includes icons 1407 representing one or more web apps in the current project from which photo content 1408 is retrieved, curate card or category 1409 includes icon 1410 representing one or more web apps in the current project from which content may curated, and calendar card or category 1412 includes icon 1413 representing one or more web apps in the current project from which calendar data 1414 is retrieved.

In some cases, cards or categories 1403, 1406, 1409, and 1412 may be re-ordered by the user, for example, by dragging and dropping cards at different locations of assist panel 1402. The user's (re)ordering cards trains assist recommender 1310 on user relevance of the offered content within a context (e.g., web app, device, time of day, collaborators, etc.). Moreover, cards or categories 1403, 1406, 1409, and 1412 may be opened or expanded to show all content feeding into it, as opposed to selected entries or a summary, for example, by double clicking. For example, the user can open the conversations card 1403 to see all conversations from every web app in the current project (e.g., SLACK, WHATSAPP, MESSENGER, TEAMS, etc.). Once expanded, the user may contract a card, for example, by double clicking it one more time; which causes the card to once again display a summary of its content.

Figure 15:
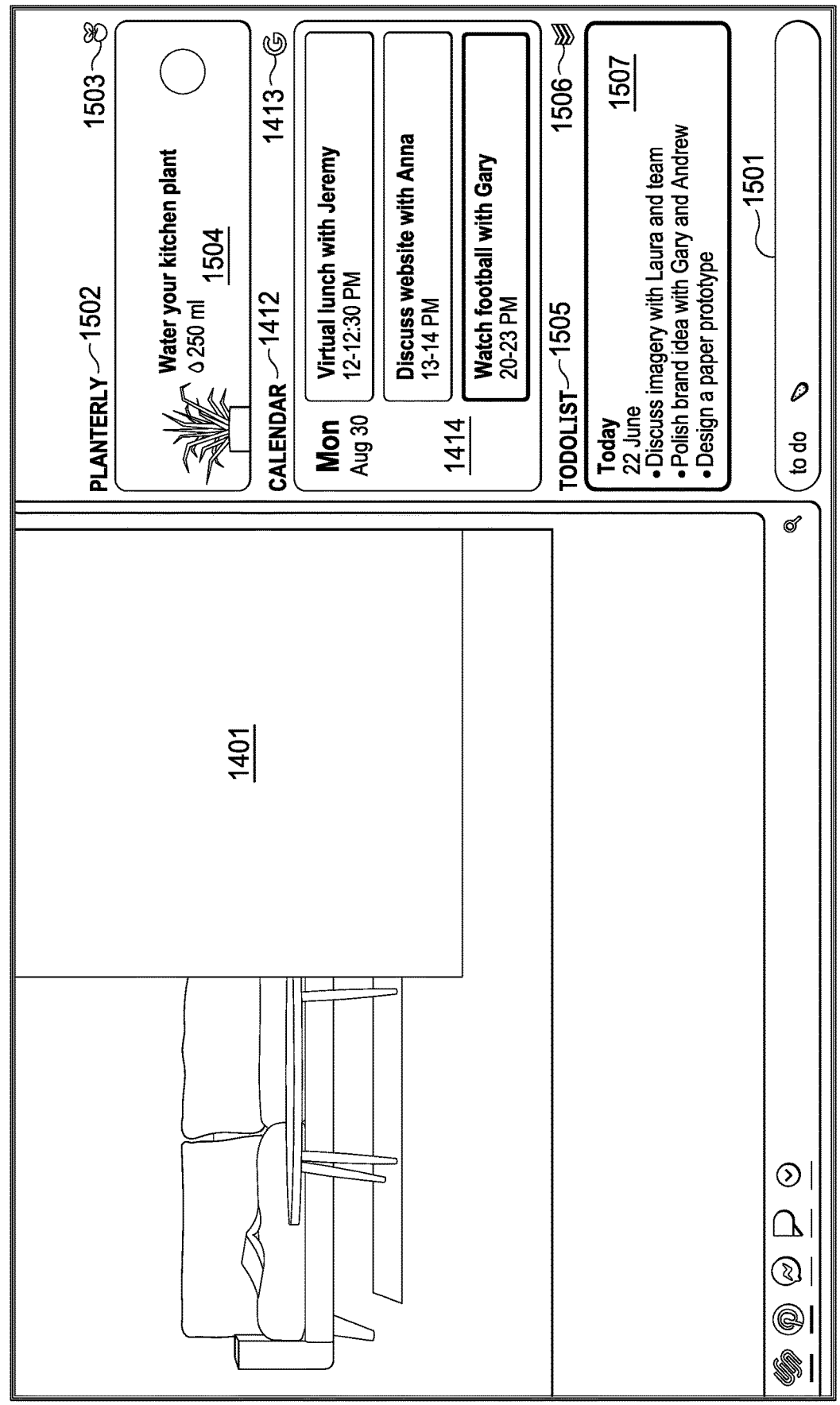

Screenshot 1500 of FIG. 15 shows the effect of the user typing a search term in search bar 1501 of the assist panel. Particularly, searches or entries into bar 1501 may dynamically refine the results offered in cards, such as by changing the cards, changing the order of the cards, and/or changing the content shown in a card. For example, a search for "to do" in search bar 1501 may result in another rendering of the assist panel with a "Planterly" card or category 1502 with icon 1503 and content 1504, a calendar card or category 1412 with icon 1413 and content 1414, and a "Todolist" card or category 1505 with icon 1506 and content 1507.

Figure 16:
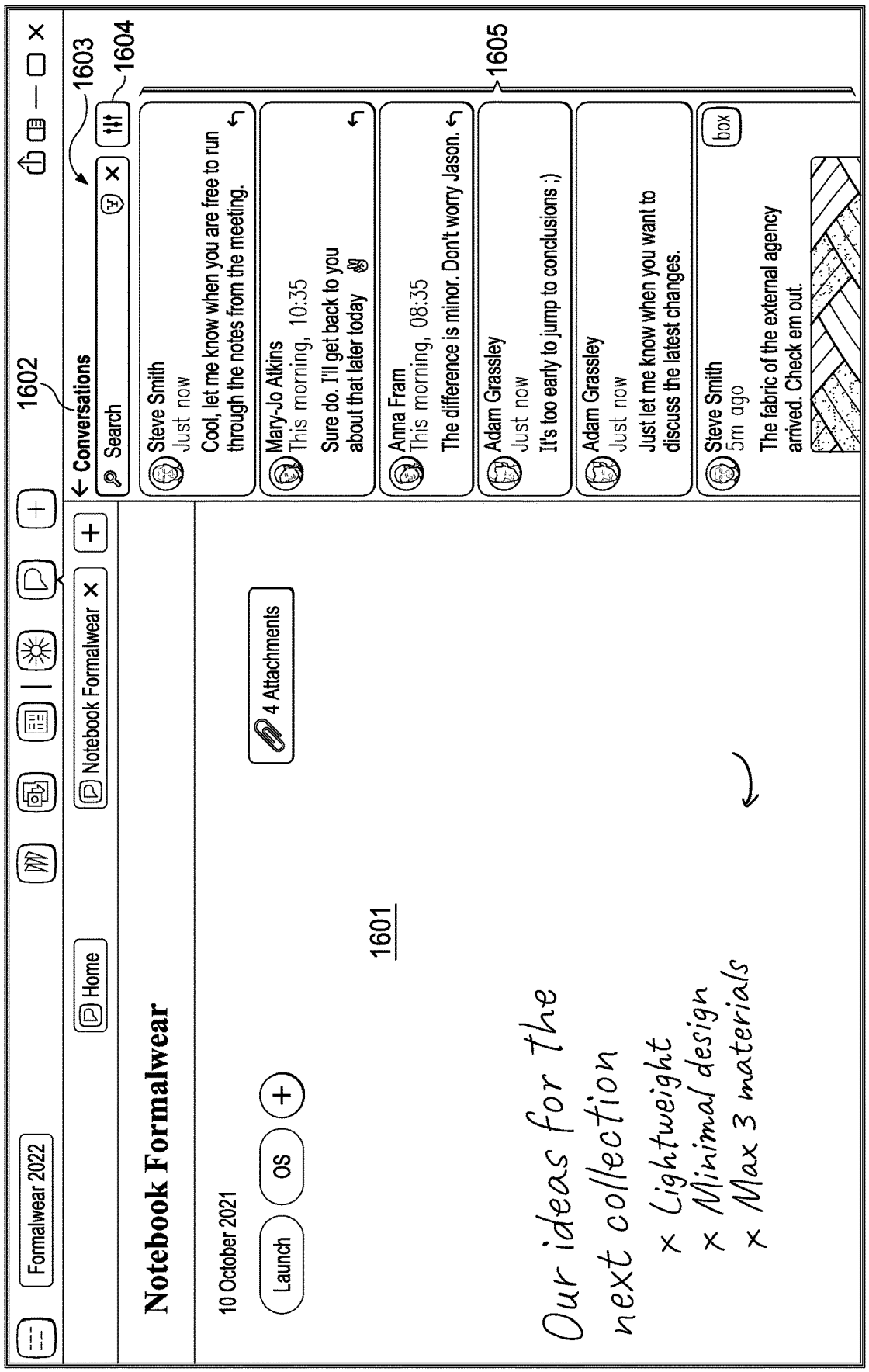
Figure 17:
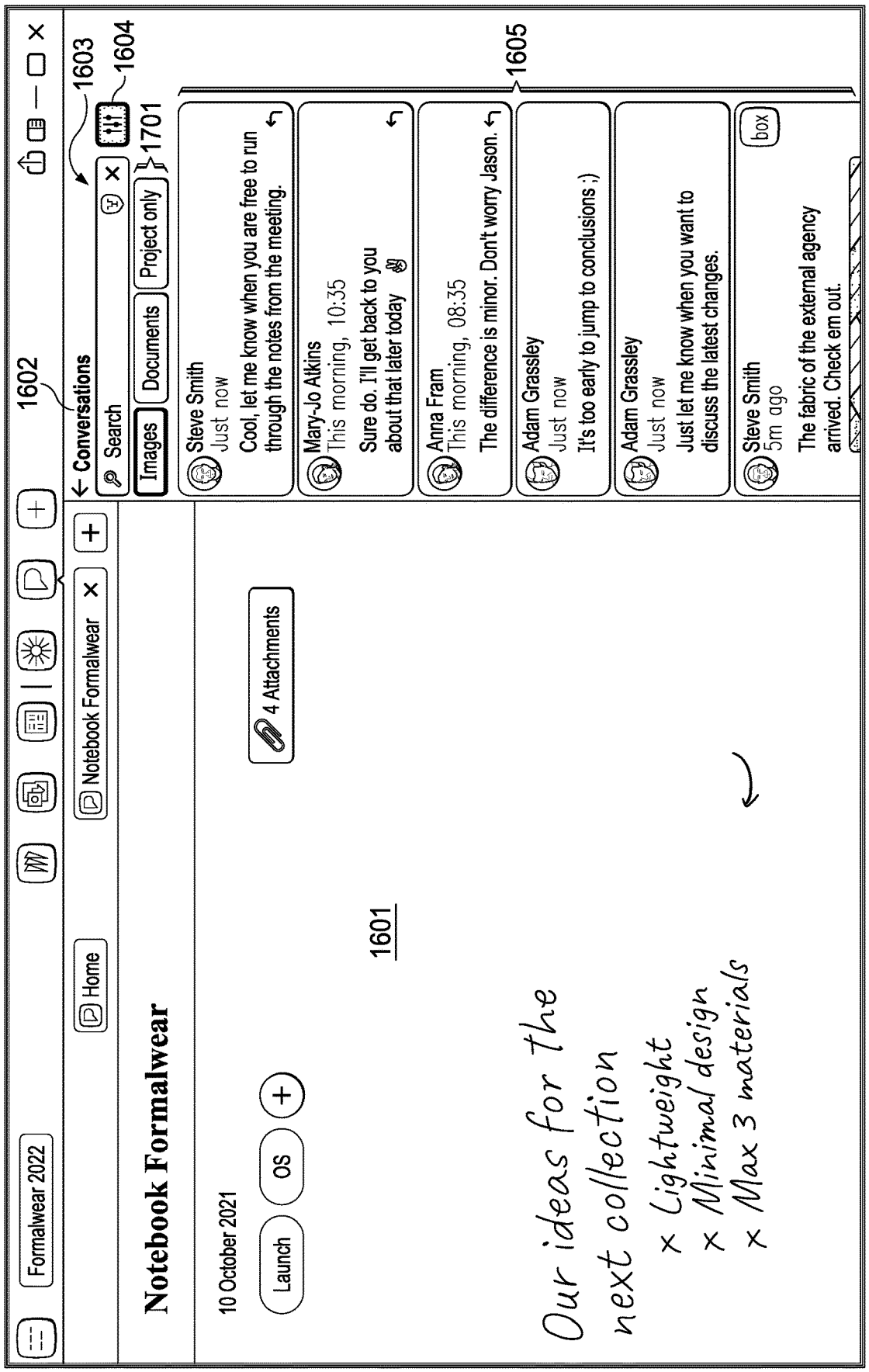
Figure 18:
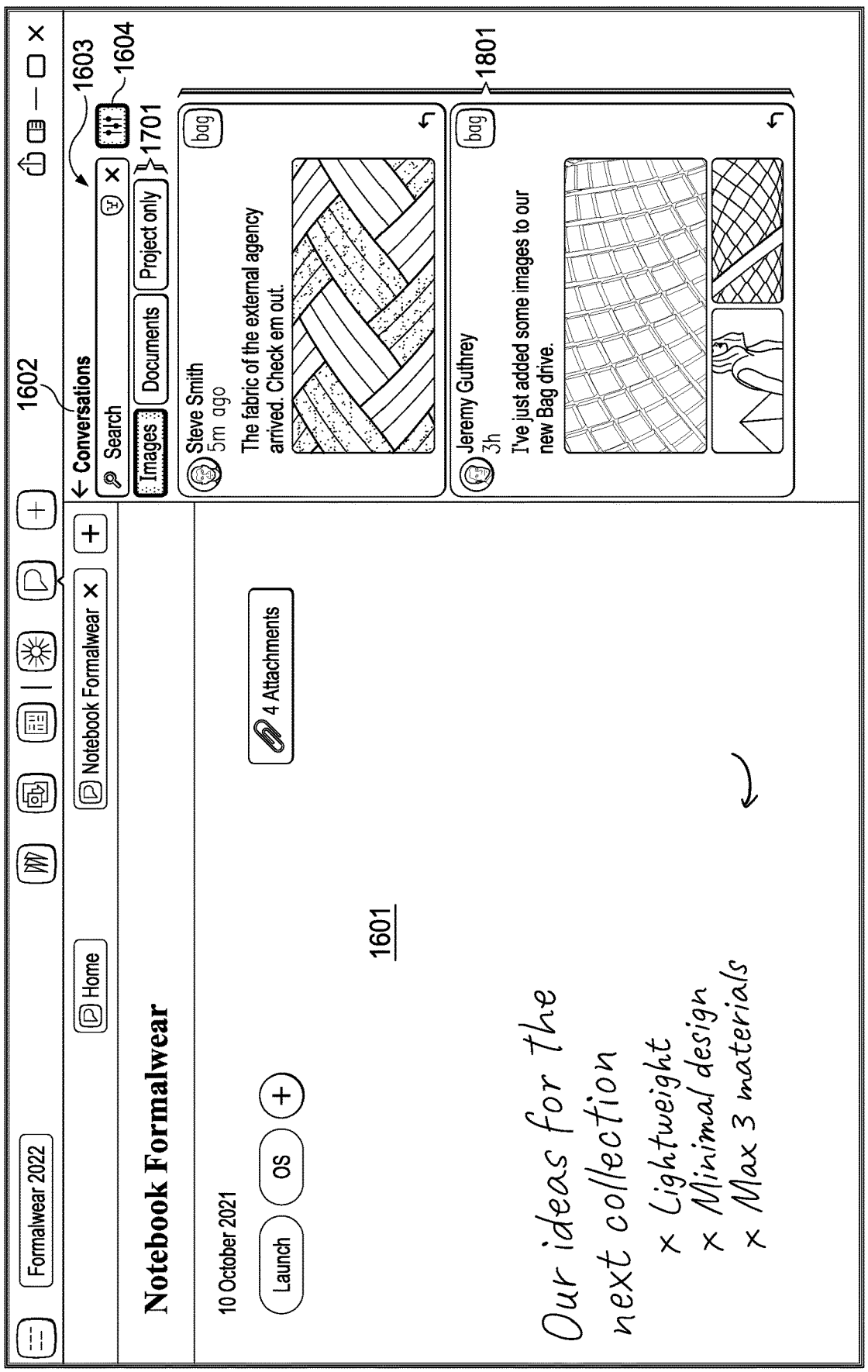
Figure 19:
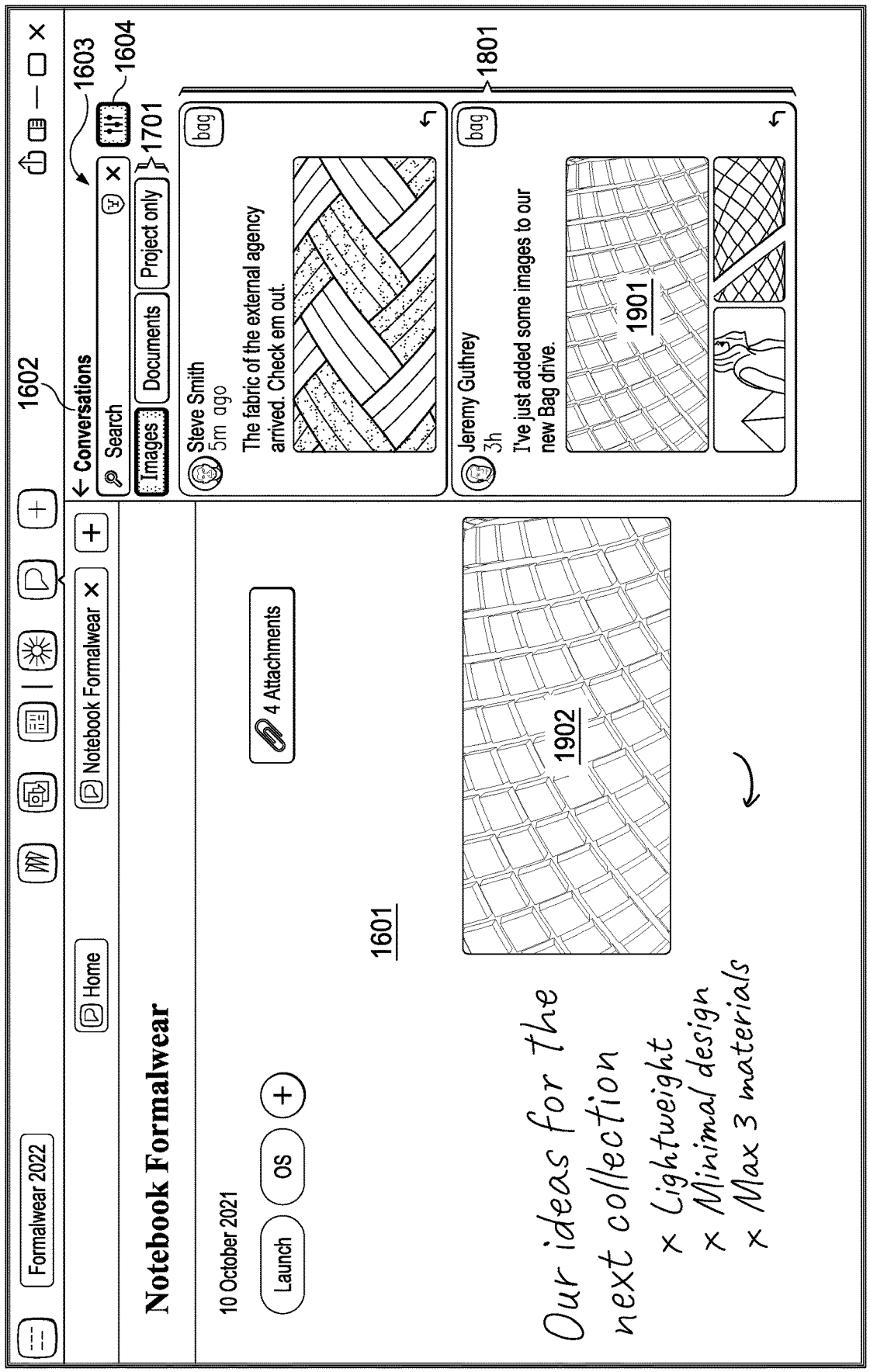

Screenshot 1600 of FIG. 16 shows the effect of the user selecting a filtering command in the assist panel. In this implementation, once the user selects the conversation card or category 1602, search bar 1603 and filter control 1604 appear, and conversation content 1605 is expanded. Screenshot 1700 of FIG. 17 shows the effect of the user clicking on filter control 1604, which causes filter buttons 1701 (e.g., images, documents, project only, etc.) to appear above expanded conversation content 1605. Screenshot 1800 of FIG. 18 shows the effect of the user clicking on a given one of filter buttons 1701 ("images") to filter the previously expanded conversation content 1605 into filtered content 1801 according to the filter parameters (e.g., only conversations with attached images are shown). Then, screenshot 1900 of FIG. 19 shows the user dragging-and-dropping image 1801 from filtered content 1801 into a web app displayed in project window 1601 as copied image 1802. In some cases, the user may also copy content from a web app or project window 1601 onto a selected card in the assist bar.

As such, in various embodiments, systems and methods described herein may provide a project notification center in the form of an assist panel, and it may allow the user to reconfigure cards in the assist panel and ordering them based on the context of the workspace (e.g., web apps, people, location, devices, etc.). The assist panel may enable application integration cards that allow the user to interact with a subset of a web app's services without directly accessing the web app (e.g., respond to a SLACK channel that is linked to the current project in the user's workspace). The assist panel may also provide a drag-and-drop capability to link dragged content from (or to) a selected card.

Moving Activities Between Devices in a Web-Based Workspace

Today, a user connects a dedicated display to IHS 100 using a cable, and the peripheral is extended using the core system. As more more devices acquire individual compute and connectivity abilities, however, the sharing of data between such devices becomes more complex. To connect a cell phone or tablet to IHS 100, systems and methods described herein may orchestrate the adoption of nearby devices into a combined workspace. These systems and methods may move activities across a set of distinct devices referred to as a "virtual device."

A virtual device may include a set of two or more individual devices, each individual device having its own I/O controller(s), compute unit (e.g., a processor), storage, and connectivity. Once a virtual device is established, systems and methods described herein can move activities to the individual device that is best fit for that activity.

Figure 20:
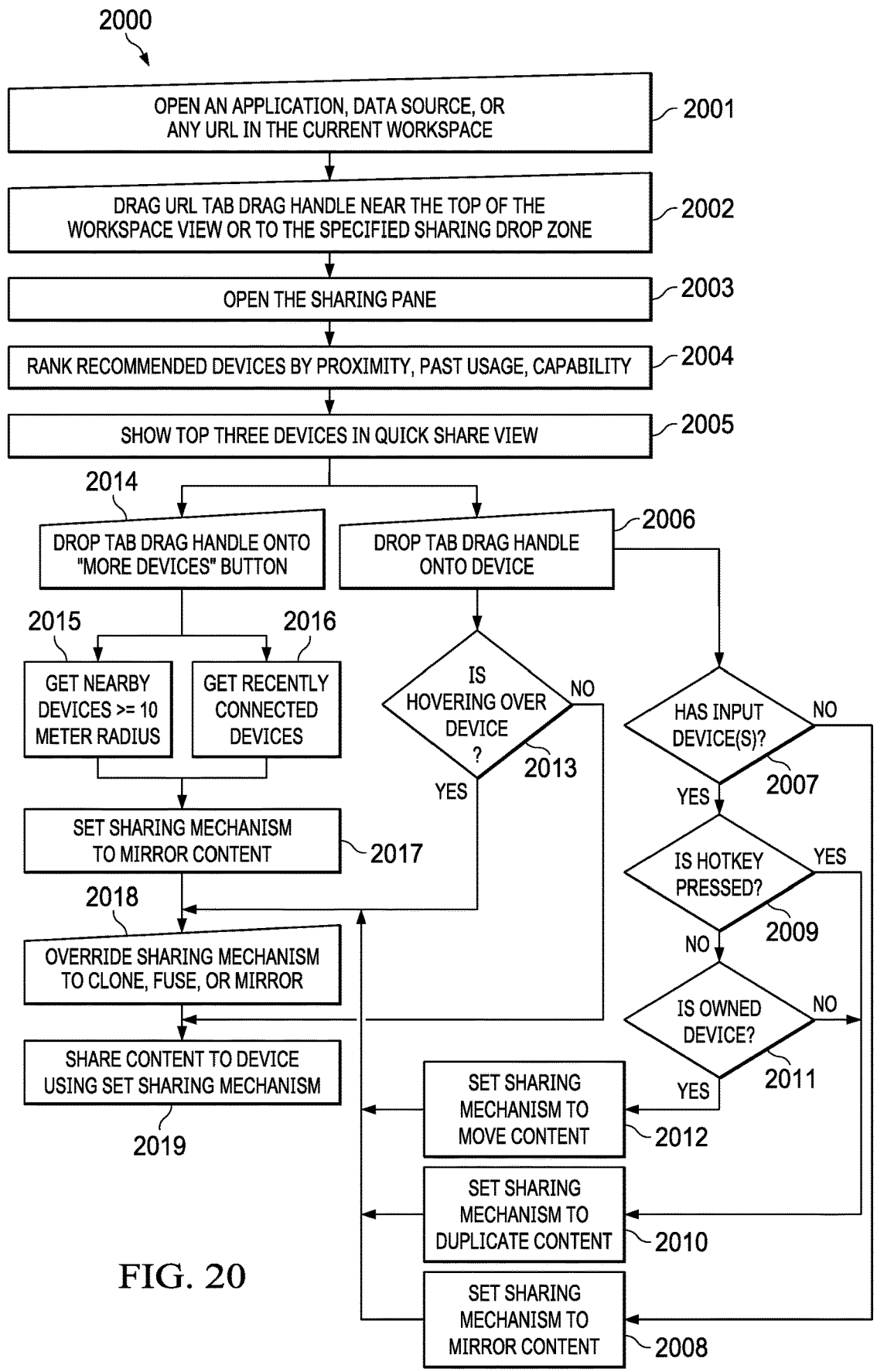
FIG. 20 is a flowchart of an example of a method for moving activities between devices in a web-based workspace, according to some embodiments.
Figure 21:
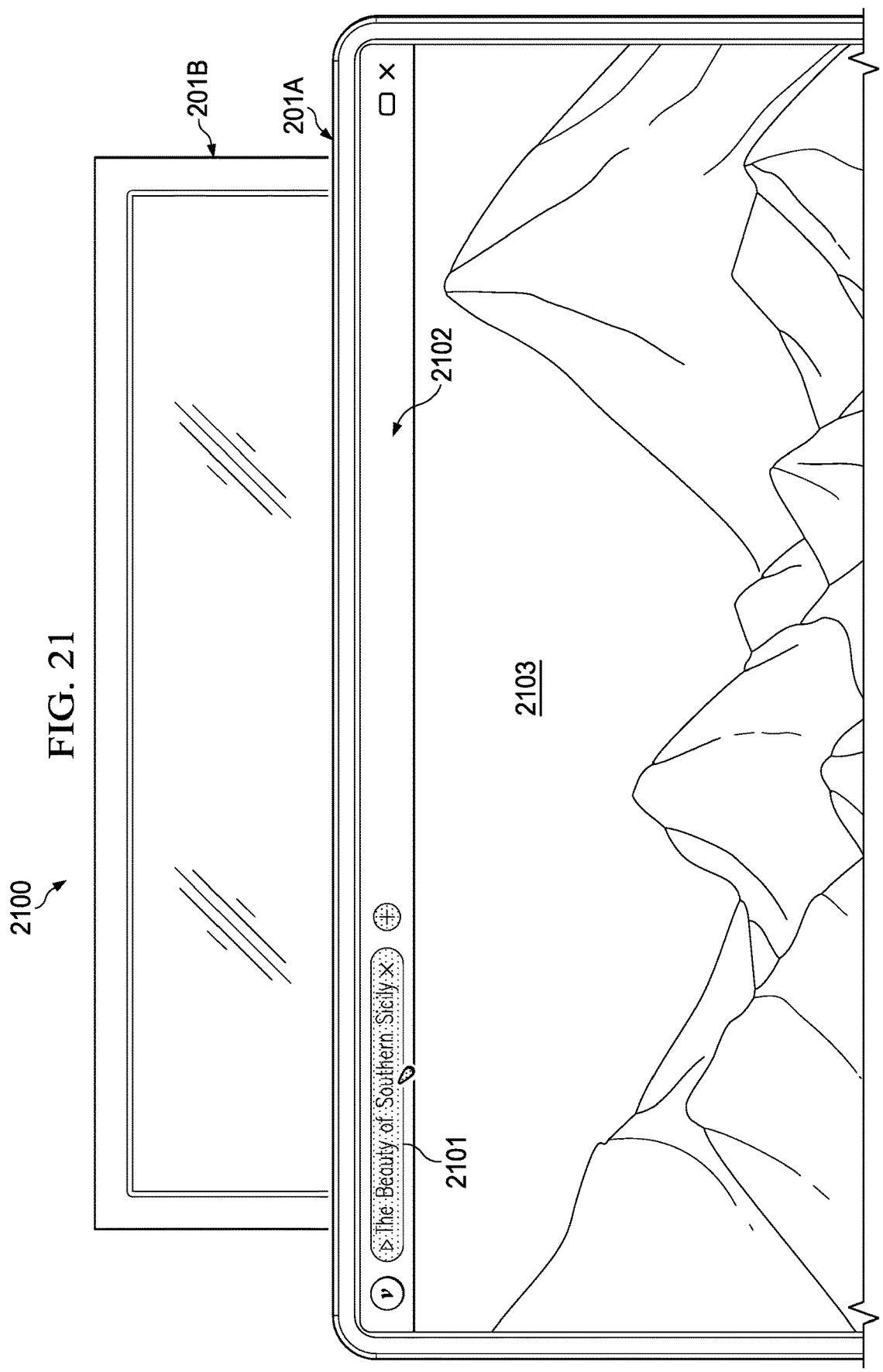
FIGS. 21 and 22 are screenshots illustrating example operations of a method for moving activities between devices in a web-based workspace, according to some embodiments.
Figure 22:
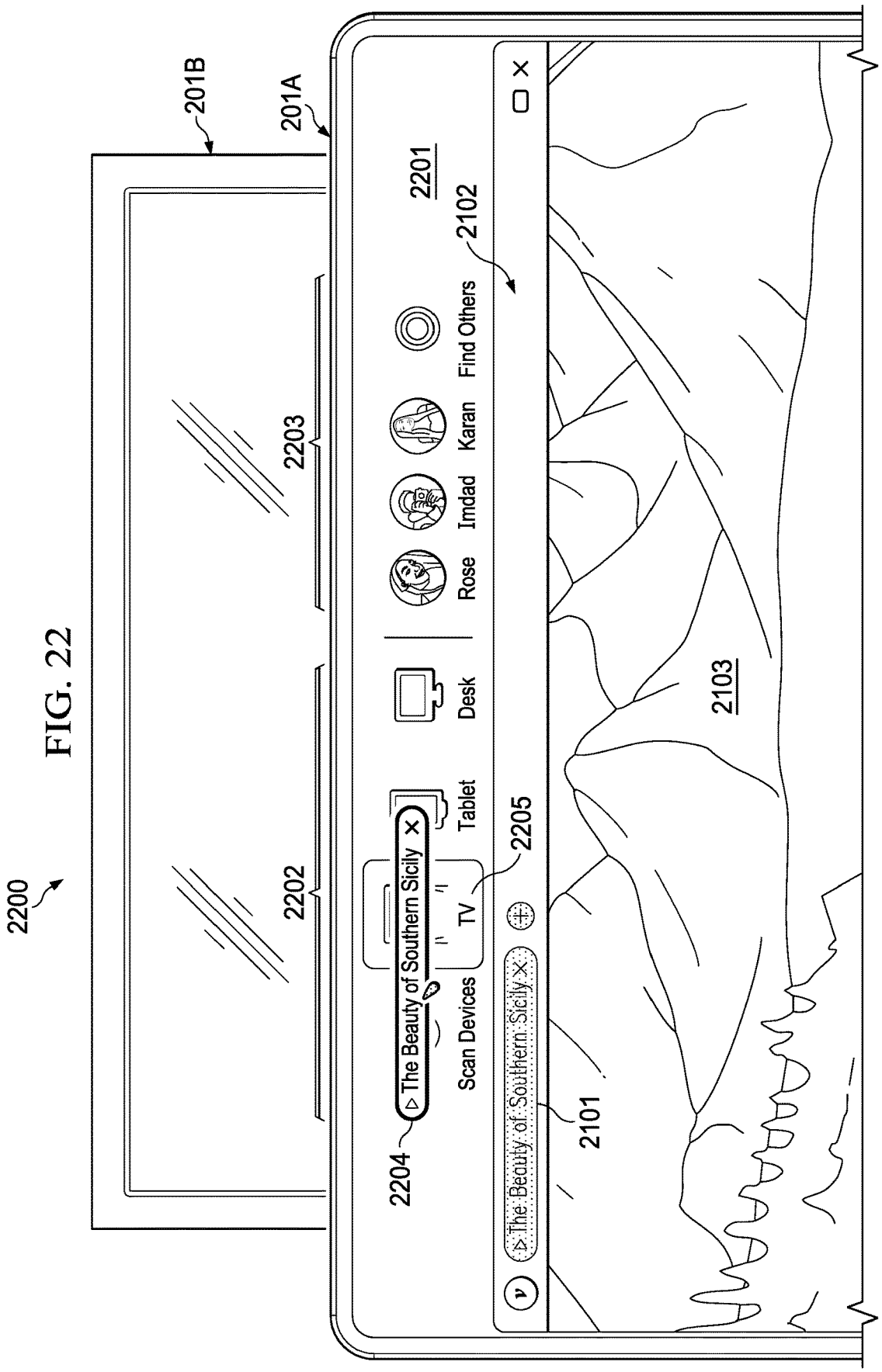

FIG. 20 is a flowchart of an example of method 2000 for moving activities between devices in a web-based workspace. In some embodiments, method 2000 may be executed by each portal OS module 204A-N in cooperation with web browsers 203A-N running on native OSs 202A-N and orchestrated with state data 207 received from cloud workspace service 206, as each browser 203A-N accesses a different web app provided by web services 208A-N to view or manipulate data sources stored in services 208A-N and/or 209A-N. In the description that follows, operations of method 2000 are illustrated with respect to screenshots 2100 and 2200 of FIGS. 21 and 22.

At 2001, the user authenticates into a workspace and opens a URL, tab, web app, or data source. At 2002, the user drags the tab, which produces a tab or URL handle, near the top of the workspace window or to a specified sharing zone. For example, in screenshot 2100 of FIG. 21, the user clicks and holds tab 2101 and drags it from workspace 2103 (e.g., browser 203A-N) to the top edge of tab bar 2102.

At 2003, method 2000 opens a sharing bar or panel. An example of sharing panel 2201 is shown in screenshot 2200 of FIG. 22, which includes device sharing portion 2202 and people sharing portion 2203. Device sharing portion 2202 includes icons that represent nearby devices 201A-N such as TV 201B, a tablet, and a desk display. As the user drags tab 2101, method 400 produces tab handle 2204 which can then be dropped onto icon 2205 for TV 201B.

At 2004, method 2000 may rank recommended devices (e.g., 201A-N) by proximity, past or recent usage, current device utilization, device capabilities, etc., and it may display icons for those devices in a preferred or suggested order (e.g., from most recommended on the left to least recommended on the right) in device sharing portion 2202. In some cases, the list of recommended devices may be received from cloud workspace service 206. For example, cloud workspace service 206 may recommend one or more devices based upon a current workload or utilization and/or capabilities of IHS 100 operated by the user. Additionally, or alternatively, cloud workspace service 206 may recommend one or more devices based upon a current workload or utilization and/or capabilities of that device.

At 2005, method 2000 may show the top N devices (e.g., 3) in a quick share view, or the like. A selected one among the list of recommended devices may be highlighted (e.g., TV icon 2205) to indicate the most suitable device for the content sharing session based on any of the aforementioned context information (e.g., a type of IHS, a posture of the IHS, a power state of the IHS, a location of the IHS, an identity of a user, a proximity of the user with respect to the IHS, a time-of-day, an identity of a nearby user, etc.).

Additionally, or alternatively, a selected one among the list of recommended devices may be highlighted to indicate the most suitable device for the content sharing session based upon an identify of a web app associated with tab 2101. Additionally, or alternatively, a selected one among the list of recommended devices may be highlighted to indicate the most suitable device for the content sharing session based upon historical user behavior.

At 2006, the user drops the tab or URL handle onto a selected device. At 2007, method 2000 determines whether the device has a required input or I/O controller. If not, at 2008 method 2000 sets the sharing mechanism to mirror content (e.g., the content of the dragged tab). If so, at 2009 method 2000 determines whether a hotkey is pressed. If so, at 2010 method 2000 sets the sharing mechanism to duplicate content. If not, at 2011 method 2000 determines if the selected device is owned by the user. If so, at 2012 method 2000 sets the sharing mechanism to move the content; otherwise, control returns to 2010.

At 2013, method 2000 determines if the user's mouse pointer is hovering over the device icon. If so, control passes to 2018; otherwise, control passes to 2019.

At 2014, the user drops the dragged tab onto a "more devices" button or control of the sharing bar or panel. In response, at 2015 method 2000 gets a list of nearby devices (e.g., within 10 meters or some other threshold distance) and at 2016 method 2000 gets a list of connected devices. At 2017, method 2000 sets the sharing mechanism to mirror content. At 2018, method 2000 overrides the sharing mechanism to clone, fuse, or mirror instances of the dragged tab, web app, or URL. At 2019, method 2000 shares content to the selected device using the sharing mechanism.

In some implementations, if a selected device is nearby (e.g., <10 m) and the device is owned by the user, then the tab, URL, or web app may be moved to that device. Alternatively, if the selected device is within reach (e.g., <10 m) but lacks input, then the tab, URL, or web app may be mirrored to the device. Alternatively, if the selected device is nearby (e.g., <10 m) and the user is holding a hotkey, then the tab, URL, or web app may be duplicated in the device.

As such, systems and methods described herein may use a characterization of the application workload and recommend the user to move the application to another device in the set of nearby devices or virtual devices. These systems and methods may define a set of virtual devices that can be fused to push content in a workspace (e.g., a hot desk with two monitors and a laptop with each having independent compute may enable the fusing of these three devices via the cloud to push content across all of them) and to orchestrate the intelligent moving of tabs and web apps across individual devices. Content may be shared, for example, using nearby devices to mirror, fuse (i.e., push), or clone tabs and web apps to other devices, for example, via cloud workspaces service 206.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a processor; and
   a memory coupled to the processor, the memory having program instructions stored thereon that, upon execution, cause the IHS to:
      in response to a determination that a user has selected a project management control in a Graphical User Interface (GUI) of a web browser, assemble a plurality of Uniform Resource Locators (URLs) open in distinct web browser tabs into a project, wherein to assemble the plurality of URLs into a project, the program instructions, upon execution, further cause the IHS to:
         parse at least one of the plurality of URLs into a resource and a data source;
         add at least one web app icon corresponding to the resource to a launch bar of the web browser; and
         associate a link preview of the data source with the web app icon.

2. The IHS of claim 1, wherein the program instructions, upon execution, further cause the IHS to prompt the user for a name and to associate the name with the project.

3. The IHS of claim 1, wherein the program instructions, upon execution, further cause the IHS to categorize the project with metadata obtained from one or more of the plurality of URLs.

4. The IHS of claim 3, wherein the metadata obtained from one or more of the plurality of URLs is further selected by the user.

5. The IHS of claim 1, wherein the program instructions, upon execution, further cause the IHS to select a color palette for the project based, at least in part, upon a representative color of at least one image selected from at least one of the plurality of URLs.

6. The IHS of claim 1, wherein the program instructions, upon execution, further cause the IHS to recommend at least one of: a team member, a calendar, a web app, or a data source to associate with the project.

7. The IHS of claim 1, wherein the program instructions, upon execution, further cause the IHS to allow the user to select a storage location for one or more data sources associated with the project.

8. The IHS of claim 1, wherein to assemble the plurality of URLs into a project, the program instructions, upon execution, further cause the IHS to create a given tile for the project, and wherein the given tile comprises an image selected from one of the plurality of URLs.

9. The IHS of claim 8, wherein the program instructions, upon execution, further cause the IHS to:
   display a plurality of tiles, each of the plurality of tiles associated with a different project; and
   in response to a determination that the user has selected the given tile, open the project.

10. The IHS of claim 9, wherein the program instructions, upon execution, further cause the IHS to display an animated representation of a team member associated with the project during a communication session between the user and the team member.

11. The IHS of claim 1, wherein the program instructions, upon execution, further cause the IHS to:
   determine that a user has selected another project management control while the project is open; and
   in response to determining that the user has selected another project management control, display a project management interface comprising at least one of: a project management panel, a team members panel, a team activity panel, or a team resources panel.

12. The IHS of claim 11, wherein the program instructions, upon execution, further cause the IHS to:
   determine that a user has selected a storage service from the team resources panel; and
   in response to determining that the user has selected a storage service, copy data associated with the project to the storage service, and grant at least one team member associated with the project access to the storage service.

13. The IHS of claim 11, wherein the project management interface is selected based, at least in part, upon context information selected from the group consisting of: a type of IHS, a posture of the IHS, a location of the IHS, an identity of the user, and a proximity of the user with respect to the IHS.

14. An Information Handling System (IHS), comprising:
a processor; and
a memory coupled to the processor, the memory having program instructions stored thereon that, upon execution, cause the IHS to:
 in response to a determination that a user has selected a project management control in a Graphical User Interface (GUI) of a web browser, assemble a plurality of Uniform Resource Locators (URLs) open in distinct web browser tabs into a project, wherein to assemble the plurality of URLs into a project, the program instructions, upon execution, further cause the IHS to create a given tile for the project, and wherein the given tile comprises an image selected from one of the plurality of URLs;
 display a plurality of tiles, each of the plurality of tiles associated with a different project; and
 in response to a determination that the user has selected the given tile, open the project, wherein to open the project, the program instructions, upon execution, further cause the IHS to open the plurality of URLs within two or more web browser tabs concurrently displayed in a foreground.

15. The IHS of claim 14, wherein to open the project, the program instructions, upon execution, further cause the IHS to display web app icons associated with the project in a launch bar of the web browser.

* * * * *